(12) United States Patent
Arnoux et al.

(10) Patent No.: US 7,511,109 B2
(45) Date of Patent: Mar. 31, 2009

(54) ROTOMOULDING POLYETHYLENE AND METHOD FOR PRODUCING SAID ROTOMOULDING POLYETHYLENE

(75) Inventors: Jacques Arnoux, Martigues (FR); Isabelle Cermelli, Sausset les Pins (FR); Estelle Meurice, St Mitre les Remparts (FR); Jean-Loic Selo, Sausset les Pins (FR)

(73) Assignee: Ineos Europe Limited, Hampshire (GB)

( * ) Notice: Subject to any disclaimer, the term of this patent is extended or adjusted under 35 U.S.C. 154(b) by 713 days.

(21) Appl. No.: 10/513,173

(22) PCT Filed: May 1, 2003

(86) PCT No.: PCT/GB03/01885

§ 371 (c)(1), (2), (4) Date: Nov. 2, 2004

(87) PCT Pub. No.: WO03/093332

PCT Pub. Date: Nov. 13, 2003

(65) Prior Publication Data

US 2005/0181932 A1 Aug. 18, 2005

(30) Foreign Application Priority Data

May 3, 2002 (EP) .................................. 02358009

(51) Int. Cl.
*C08F 210/14* (2006.01)
*C08F 2/34* (2006.01)
*B28B 1/20* (2006.01)

(52) U.S. Cl. ...................... 526/348.5; 526/60; 526/352; 526/901

(58) Field of Classification Search ................... 526/60, 526/901, 348.5, 352
See application file for complete search history.

(56) References Cited

U.S. PATENT DOCUMENTS

| 5,530,055 A | 6/1996 | Needham |
| 5,922,778 A | 7/1999 | Strebel |
| 6,144,897 A | 11/2000 | Selliers |
| 6,897,181 B2 * | 5/2005 | Mihan et al. ................. 502/224 |

FOREIGN PATENT DOCUMENTS

| EP | 0 905 145 A1 | 3/1999 |
| EP | 1 041 085 A1 | 10/2000 |
| EP | 1 172 381 A1 | 1/2002 |
| EP | 1 236 770 A1 | 9/2002 |
| WO | WO 95/04761 | 2/1995 |
| WO | WO 96/34898 | 11/1996 |
| WO | WO 00/69919 | 11/2000 |
| WO | WO 01/49751 A1 | 7/2001 |
| WO | WO 01/90204 A1 * | 11/2001 |

* cited by examiner

*Primary Examiner*—Fred M Teskin
(74) *Attorney, Agent, or Firm*—Nixon & Vanderhye, PC

(57) ABSTRACT

A method for producing rotomoulding polyethylene by fluidized bed gas phase polymerisation of ethylene and the improved rotomoulding polyethylene obtainable by the process.

10 Claims, 40 Drawing Sheets

Fig.1A

|  | Density 930 | Density 931 |
|---|---|---|
| Melt-Index | | |
| 3.00 | RTSE T° 4.4 92.6 / 4.35 94.0 / 4.3 95.4 / 4.25 96.8 / 4.2 96.3 | RTSE T° 4.4 93.8 / 4.35 95.2 / 4.3 96.6 / 4.25 98.0 / 4.2 99.4 |
| 3.20 | RTSE T° 4.4 92.2 / 4.35 93.6 / 4.3 95.0 / 4.25 96.4 / 4.2 97.9 | RTSE T° 4.4 93.4 / 4.35 94.8 / 4.3 96.2 / 4.25 97.5 / 4.2 99.0 |
| 3.40 | RTSE T° 4.4 91.9 / 4.35 93.2 / 4.3 94.6 / 4.25 96.0 / 4.2 97.5 | RTSE T° 4.4 93.0 / 4.35 94.4 / 4.3 95.8 / 4.25 97.2 / 4.2 98.7 |
| 3.60 | RTSE T° 4.4 91.5 / 4.35 92.9 / 4.3 94.3 / 4.25 95.7 / 4.2 97.1 | RTSE T° 4.4 92.7 / 4.35 94.0 / 4.3 95.4 / 4.25 96.9 / 4.2 98.3 |
| 3.80 | RTSE T° 4.4 91.1 / 4.35 92.5 / 4.3 93.9 / 4.25 95.3 / 4.2 96.8 | RTSE T° 4.4 92.3 / 4.35 93.7 / 4.3 95.1 / 4.25 96.5 / 4.2 97.9 |

ANNOTATED SHEET SHOWING CHANGES

Fig.1B

| Melt-Index | Density 932 | Density 933 |

(Figure showing grid of cells at Melt-Index values 3.00, 3.20, 3.40, 3.60, 3.80 and Density 932, 933)

Melt-Index 3.00, Density 932:
- RTSE 4.4  T° 95.0
- RTSE 4.35  T° 96.4
- RTSE 4.3  T° 97.7
- RTSE 4.25  T° 99.2
- RTSE 4.2  T° 100.6

Melt-Index 3.00, Density 933:
- RTSE 4.4  T° 96.1
- RTSE 4.35  T° 97.5
- RTSE 4.3  T° 98.9
- RTSE 4.25  T° 100.3
- RTSE 4.2  T° 101.7

Melt-Index 3.20, Density 932:
- RTSE 4.4  T° 94.6
- RTSE 4.35  T° 95.9
- RTSE 4.3  T° 97.3
- RTSE 4.25  T° 98.8
- RTSE 4.2  T° 100.2

Melt-Index 3.20, Density 933:
- RTSE 4.4  T° 95.7
- RTSE 4.35  T° 97.1
- RTSE 4.3  T° 98.5
- RTSE 4.25  T° 99.9
- RTSE 4.2  T° 101.3

Melt-Index 3.40, Density 932:
- RTSE 4.4  T° 94.2
- RTSE 4.35  T° 95.8
- RTSE 4.3  T° 97.0
- RTSE 4.25  T° 98.4
- RTSE 4.2  T° 99.8

Melt-Index 3.40, Density 933:
- RTSE 4.4  T° 95.3
- RTSE 4.35  T° 96.7
- RTSE 4.3  T° 98.1
- RTSE 4.25  T° 99.5
- RTSE 4.2  T° 100.9

Melt-Index 3.60, Density 932:
- RTSE 4.4  T° 93.8
- RTSE 4.35  T° 95.2
- RTSE 4.3  T° 96.6
- RTSE 4.25  T° 98.0
- RTSE 4.2  T° 99.4

Melt-Index 3.60, Density 933:
- RTSE 4.4  T° 94.9
- RTSE 4.35  T° 96.3
- RTSE 4.3  T° 97.7
- RTSE 4.25  T° 99.1
- RTSE 4.2  T° 100.6

Melt-Index 3.80, Density 932:
- RTSE 4.4  T° ~~93.8~~ 93.4
- RTSE 4.35  T° ~~95.2~~ 94.8
- RTSE 4.3  T° ~~96.6~~ 96.2
- RTSE 4.25  T° ~~98.0~~ 97.6
- RTSE 4.2  T° ~~99.4~~ 99.0

Melt-Index 3.80, Density 933:
- RTSE 4.4  T° 94.6
- RTSE 4.35  T° 96.0
- RTSE 4.3  T° 97.4
- RTSE 4.25  T° 98.8
- RTSE 4.2  T° 100.2

| Melt-Index | Density 934 | Density 935 |
|---|---|---|
| 3.00 | RTSE T° 4.4 97.2<br>RTSE T° 4.35 98.6<br>RTSE T° 4.3 100.0<br>RTSE T° 4.25 101.4<br>RTSE T° 4.2 102.8 | RTSE T° 4.4 98.3<br>RTSE T° 4.35 99.7<br>RTSE T° 4.3 101.0<br>RTSE T° 4.25 102.5<br>RTSE T° 4.2 103.9 |
| 3.20 | RTSE T° 4.4 96.8<br>RTSE T° 4.35 98.2<br>RTSE T° 4.3 99.6<br>RTSE T° 4.25 101.0<br>RTSE T° 4.2 102.4 | RTSE T° 4.4 97.9<br>RTSE T° 4.35 99.3<br>RTSE T° 4.3 100.6<br>RTSE T° 4.25 102.1<br>RTSE T° 4.2 103.5 |
| 3.40 | RTSE T° 4.4 96.4<br>RTSE T° 4.35 97.8<br>RTSE T° 4.3 99.2<br>RTSE T° 4.25 100.6<br>RTSE T° 4.2 102.0 | RTSE T° 4.4 97.5<br>RTSE T° 4.35 98.9<br>RTSE T° 4.3 100.3<br>RTSE T° 4.25 101.7<br>RTSE T° 4.2 103.1 |
| 3.60 | RTSE T° 4.4 96.0<br>RTSE T° 4.35 97.4<br>RTSE T° 4.3 98.8<br>RTSE T° 4.25 100.2<br>RTSE T° 4.2 101.7 | RTSE T° 4.4 97.1<br>RTSE T° 4.35 98.5<br>RTSE T° 4.3 99.9<br>RTSE T° 4.25 11.3<br>RTSE T° 4.2 102.7 |
| 3.80 | RTSE T° 4.4 95.7<br>RTSE T° 4.35 97.1<br>RTSE T° 4.3 98.5<br>RTSE T° 4.25 99.9<br>RTSE T° 4.2 101.3 | RTSE T° 4.4 96.8<br>RTSE T° 4.35 98.1<br>RTSE T° 4.3 99.5<br>RTSE T° 4.25 101.0<br>RTSE T° 4.2 102.4 |

| | Density | | |
|---|---|---|---|
| Melt-Index | 936 | | 937 |

| Melt-Index | 936 | 937 |
|---|---|---|
| 5.00 | RTSE T° 4.4 96.0<br>RTSE T° 4.35 97.3<br>RTSE T° 4.3 98.7<br>RTSE T° 4.25 100.2<br>RTSE T° 4.2 101.6 | RTSE T° 4.4 97.0<br>RTSE T° 4.35 98.4<br>RTSE T° 4.3 99.8<br>RTSE T° 4.25 101.2<br>RTSE T° 4.2 102.6 |
| 5.20 | RTSE T° 4.4 95.7<br>RTSE T° 4.35 97.1<br>RTSE T° 4.3 98.5<br>RTSE T° 4.25 99.9<br>RTSE T° 4.2 101.3 | RTSE T° 4.4 96.7<br>RTSE T° 4.35 98.1<br>RTSE T° 4.3 99.5<br>RTSE T° 4.25 100.9<br>RTSE T° 4.2 102.3 |
| 5.40 | RTSE T° 4.4 95.4<br>RTSE T° 4.35 96.8<br>RTSE T° 4.3 98.2<br>RTSE T° 4.25 99.6<br>RTSE T° 4.2 101.1 | RTSE T° 4.4 96.5<br>RTSE T° 4.35 97.8<br>RTSE T° 4.3 99.2<br>RTSE T° 4.25 100.7<br>RTSE T° 4.2 102.1 |
| 5.60 | RTSE T° 4.4 96.2<br>RTSE T° 4.35 96.6<br>RTSE T° 4.3 98.0<br>RTSE T° 4.25 99.4<br>RTSE T° 4.2 100.8 | RTSE T° 4.4 96.2<br>RTSE T° 4.35 97.6<br>RTSE T° 4.3 99.0<br>RTSE T° 4.25 100.4<br>RTSE T° 4.2 101.8 |
| 5.80 | RTSE T° 4.4 94.9<br>RTSE T° 4.35 96.3<br>RTSE T° 4.3 97.7<br>RTSE T° 4.25 99.1<br>RTSE T° 4.2 100.6 | RTSE T° 4.4 96.0<br>RTSE T° 4.35 97.3<br>RTSE T° 4.3 98.7<br>RTSE T° 4.25 100.1<br>RTSE T° 4.2 101.6 |

*Fig.8B*

| Melt-Index | Density | | | |
|---|---|---|---|---|
| | 934 | | 935 | |

| | | | | |
|---|---|---|---|---|
| 6.00 | RTSE T° 4.4 92.6 | | RTSE T° 4.4 93.6 | |
| | | RTSE T° 4.35 93.9 | | RTSE T° 4.35 95.0 |
| | | RTSE T° 4.3 95.3 | | RTSE T° 4.3 96.4 |
| | | RTSE T° 4.25 96.8 | | RTSE T° 4.25 97.8 |
| | | RTSE T° 4.2 98.2 | | RTSE T° 4.2 99.3 |
| 6.20 | RTSE T° 4.4 92.3 | | RTSE T° 4.4 93.4 | |
| | | RTSE T° 4.35 93.7 | | RTSE T° 4.35 94.8 |
| | | RTSE T° 4.3 95.1 | | RTSE T° 4.3 96.2 |
| | | RTSE T° 4.25 96.5 | | RTSE T° 4.25 97.6 |
| | | RTSE T° 4.2 98.0 | | RTSE T° 4.2 99.0 |
| 6.40 | RTSE T° 4.4 92.1 | | RTSE T° 4.4 93.2 | |
| | | RTSE T° 4.35 93.5 | | RTSE T° 4.35 94.6 |
| | | RTSE T° 4.3 94.9 | | RTSE T° 4.3 96.0 |
| | | RTSE T° 4.25 96.3 | | RTSE T° 4.25 97.4 |
| | | RTSE T° 4.2 97.7 | | RTSE T° 4.2 98.8 |
| 6.60 | RTSE T° 4.4 91.9 | | RTSE T° 4.4 93.0 | |
| | | RTSE T° 4.35 93.3 | | RTSE T° 4.35 94.3 |
| | | RTSE T° 4.3 94.7 | | RTSE T° 4.3 95.7 |
| | | RTSE T° 4.25 96.1 | | RTSE T° 4.25 97.2 |
| | | RTSE T° 4.2 97.5 | | RTSE T° 4.2 98.6 |
| 6.80 | RTSE T° 4.4 91.7 | | RTSE T° 4.4 92.7 | |
| | | RTSE T° 4.35 93.1 | | RTSE T° 4.35 94.1 |
| | | RTSE T° 4.3 94.4 | | RTSE T° 4.3 95.5 |
| | | RTSE T° 4.25 95.9 | | RTSE T° 4.25 96.9 |
| | | RTSE T° 4.2 97.3 | | RTSE T° 4.2 98.4 |

*Fig.9A*

Melt-Index / Density

| Melt-Index | 944 | 945 |
|---|---|---|
| 3.00 | RTSE T° 4.4 106.9<br>RTSE T° 4.35 108.3<br>RTSE T° 4.3 109.6<br>RTSE T° 4.25 111.1<br>RTSE T° 4.2 112.5 | RTSE T° 4.4 107.7<br>RTSE T° 4.35 109.1<br>RTSE T° 4.3 110.5<br>RTSE T° 4.25 111.9<br>RTSE T° 4.2 113.3 |
| 3.20 | RTSE T° 4.4 106.5<br>RTSE T° 4.35 107.9<br>RTSE T° 4.3 109.2<br>RTSE T° 4.25 110.7<br>RTSE T° 4.2 112.1 | RTSE T° 4.4 107.3<br>RTSE T° 4.35 108.7<br>RTSE T° 4.3 110.1<br>RTSE T° 4.25 111.5<br>RTSE T° 4.2 112.9 |
| 3.40 | RTSE T° 4.4 106.1<br>RTSE T° 4.35 107.5<br>RTSE T° 4.3 108.9<br>RTSE T° 4.25 110.3<br>RTSE T° 4.2 111.7 | RTSE T° 4.4 106.9<br>RTSE T° 4.35 108.3<br>RTSE T° 4.3 109.7<br>RTSE T° 4.25 111.1<br>RTSE T° 4.2 112.5 |
| 3.60 | RTSE T° 4.4 105.7<br>RTSE T° 4.35 107.1<br>RTSE T° 4.3 108.5<br>RTSE T° 4.25 109.9<br>RTSE T° 4.2 111.3 | RTSE T° 4.4 106.6<br>RTSE T° 4.35 107.9<br>RTSE T° 4.3 109.3<br>RTSE T° 4.25 110.7<br>RTSE T° 4.2 112.2 |
| 3.80 | RTSE T° 4.4 105.4<br>RTSE T° 4.35 106.7<br>RTSE T° 4.3 108.1<br>RTSE T° 4.25 109.6<br>RTSE T° 4.2 111.0 | RTSE T° 4.4 106.2<br>RTSE T° 4.35 107.6<br>RTSE T° 4.3 109.0<br>RTSE T° 4.25 110.4<br>RTSE T° 4.2 111.8 |

Fig. 16B

ROTOMOULDING POLYETHYLENE AND METHOD FOR PRODUCING SAID ROTOMOULDING POLYETHYLENE

BACKGROUND OF THE INVENTION

The present invention relates to a method for producing rotomoulding polyethylene by fluidised bed gas phase polymerisation of ethylene. The present invention further relates to the improved rotomoulding polyethylene obtainable by the invention process.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer, which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

A gas fluidised bed polymerisation reactor is typically controlled to achieve a desired melt index and density for the polymer at an optimum production. Conditions within the polymerisation reactor have to be carefully controlled to reduce the risk of agglomerate and/or sheet formation which may ultimately lead to bed instabilities and a need to terminate the reaction and shut down the reactor. This is the reason why commercial scale reactors are designed to operate well within proven stable operating zones and why the reactors are used in a carefully circumscribed fashion.

SUMMARY OF THE INVENTION

It has now been found a new process for producing rotomoulding polyethylene in fluidised bed gas phase reactor, wherein an improved process-operating envelope is used. Thus, the present invention relates to a process for producing rotomoulding polyethylene, having a density A comprised between 930 and 944 kg/m3 and a melt index B comprised between 3 and 7.8, by (co-)polymerisation of ethylene in a fluidised bed gas phase reactor, said process comprising determining the instantaneous density d and melt index MI of the polyethylene powder exiting the reactor, allowing the density and melt index to vary around their A and B values by a value of plus or minus 3 kg/m3 for the density and plus or minus 30% for the melt index, characterised in that the operating temperature is controlled such that
1. the RTSE factor is first maintained in the operating-enveloppe corresponding to the d and MI values of the polyethylene produced, and
2. the RTSE factor is maintained between 4.2 and 4.4.

BRIEF DESCRIPTION OF THE DRAWINGS

FIGS. 1A to 20B are Tables showing the RTSE factor that is maintained between a value of 4.2 and 4.4 according to the present invention.

DETAILED DESCRIPTION OF THE INVENTION

The present invention further relates to a rotomoulding polyethylene grade having a density comprised between 930 and 944 kg/m3 and a melt index comprised between 3 and 7.8 characterised in an ESCR property equal or higher than 400 h and a Charpy property equal or higher than 10 kJ/m2. Preferably, the said polyethylene is a non-metallocene containing polymer.

The ESCR can be measured according to ASTM-D-1693.

The Charpy can be measured according to ISO 179-2. Preferably, the Charpy value is equal or higher than 14 kJ/m2.

The densities can be measured according to ASTM-D-792 and defined as in ASTM-D-1248-84. The rotomoulding polyethylene of the present invention has a density comprised between 930 and 944, preferably between 933 and 941 kg/m3.

The melt index can be measured according to ASTM-D-1238, condition A (2.16 kg). The rotomoulding polyethylene of the present invention has a melt index comprised between 3 and 7.8, preferably between 3 and 7 g/10 min.

According to the present invention, the density and melt index are respectively allowed to vary around their A and B values by a value of plus or minus 3 kg/m3 for the density and plus or minus 30% for the melt index. It means, for example, that for a rotomoulding polyethylene with A=937 and B=5, acceptable variations are for density from 934 to 941 and for melt index from 3.5 to 6.5. According to a preferred embodiment of the present invention, the density and melt index are respectively allowed to vary around their A and B values by a value of plus or minus 2 kg/m3 for the density and plus or minus 15% for the melt index.

Figure 2A:
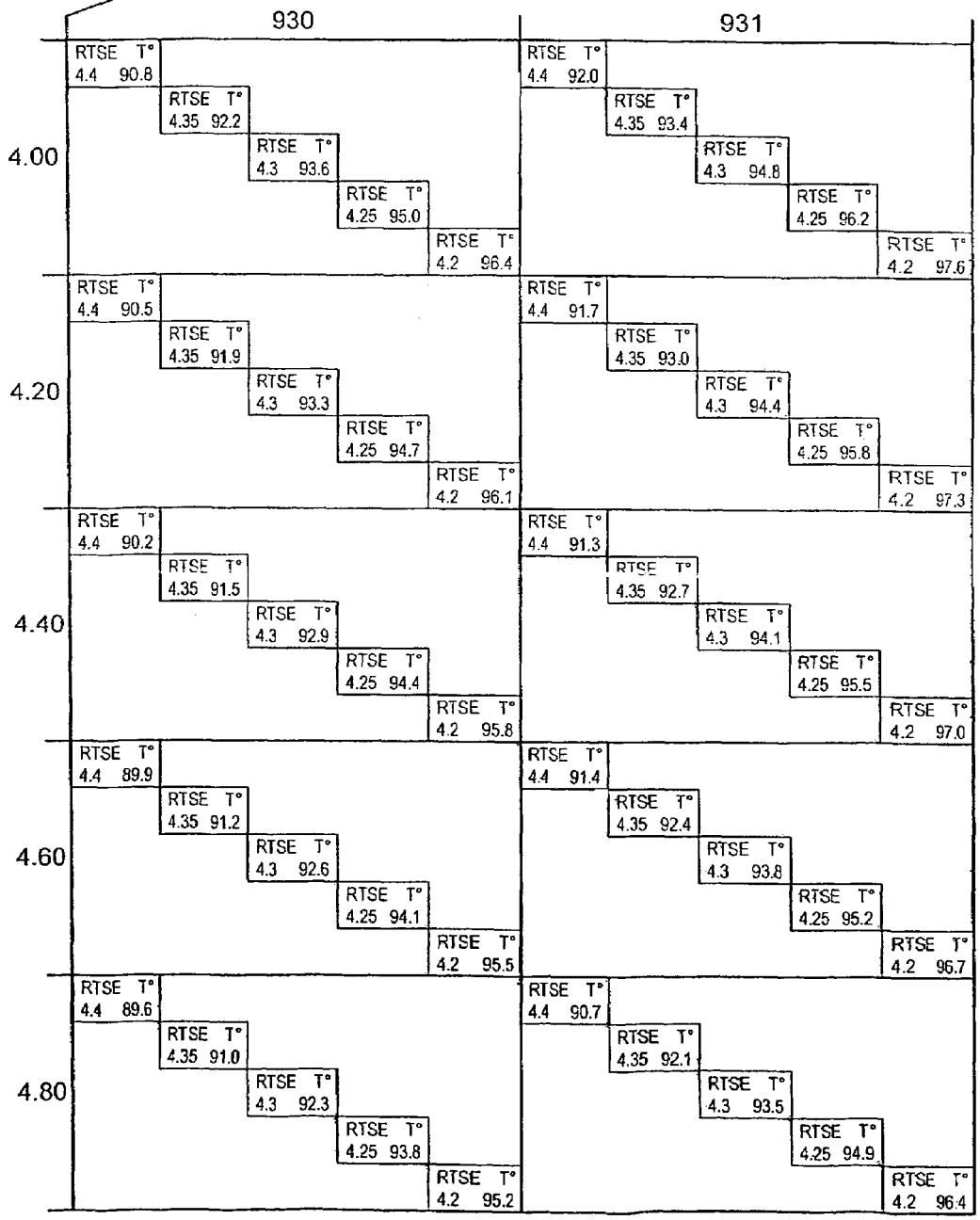
Figure 2B:
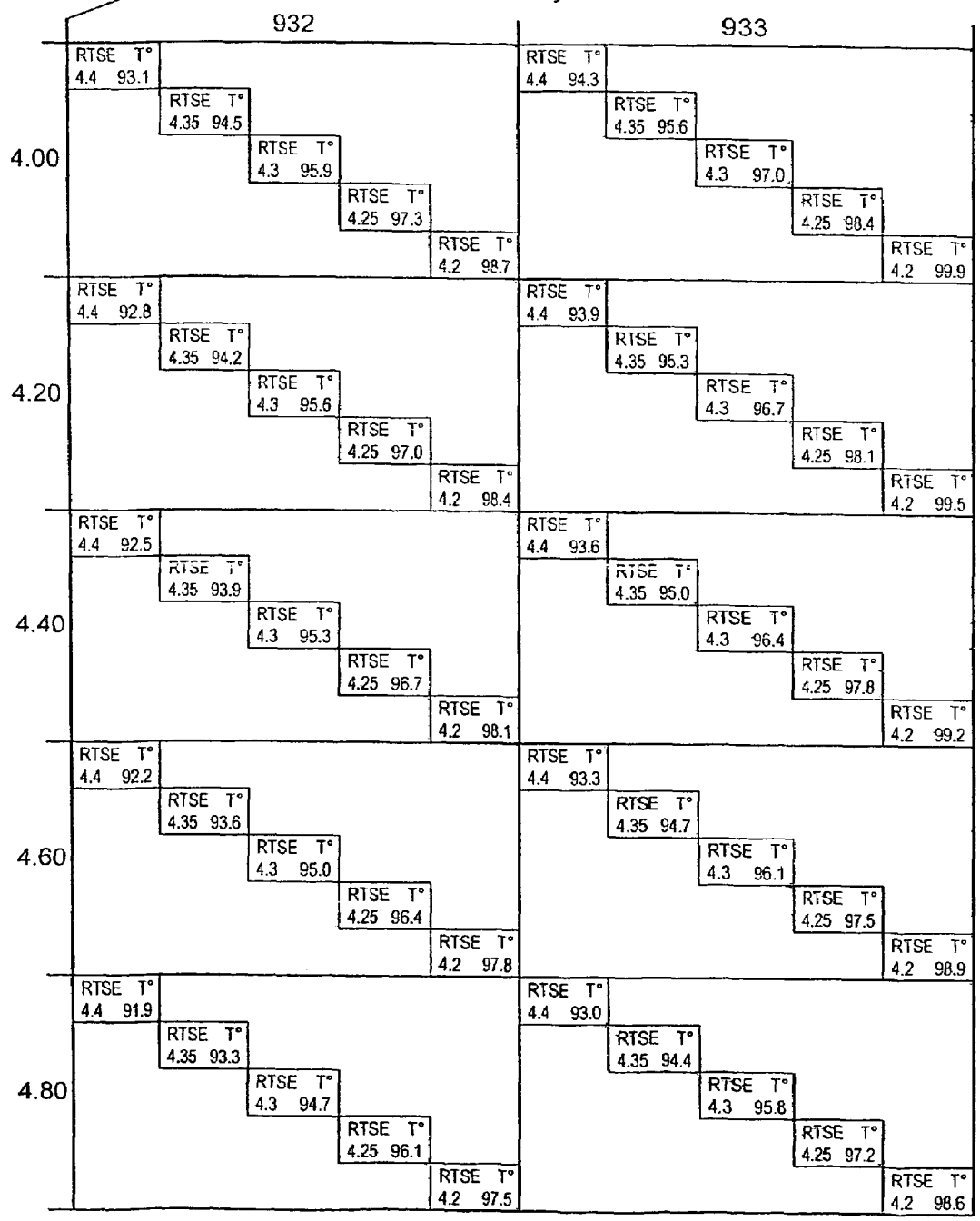
Figure 3A:
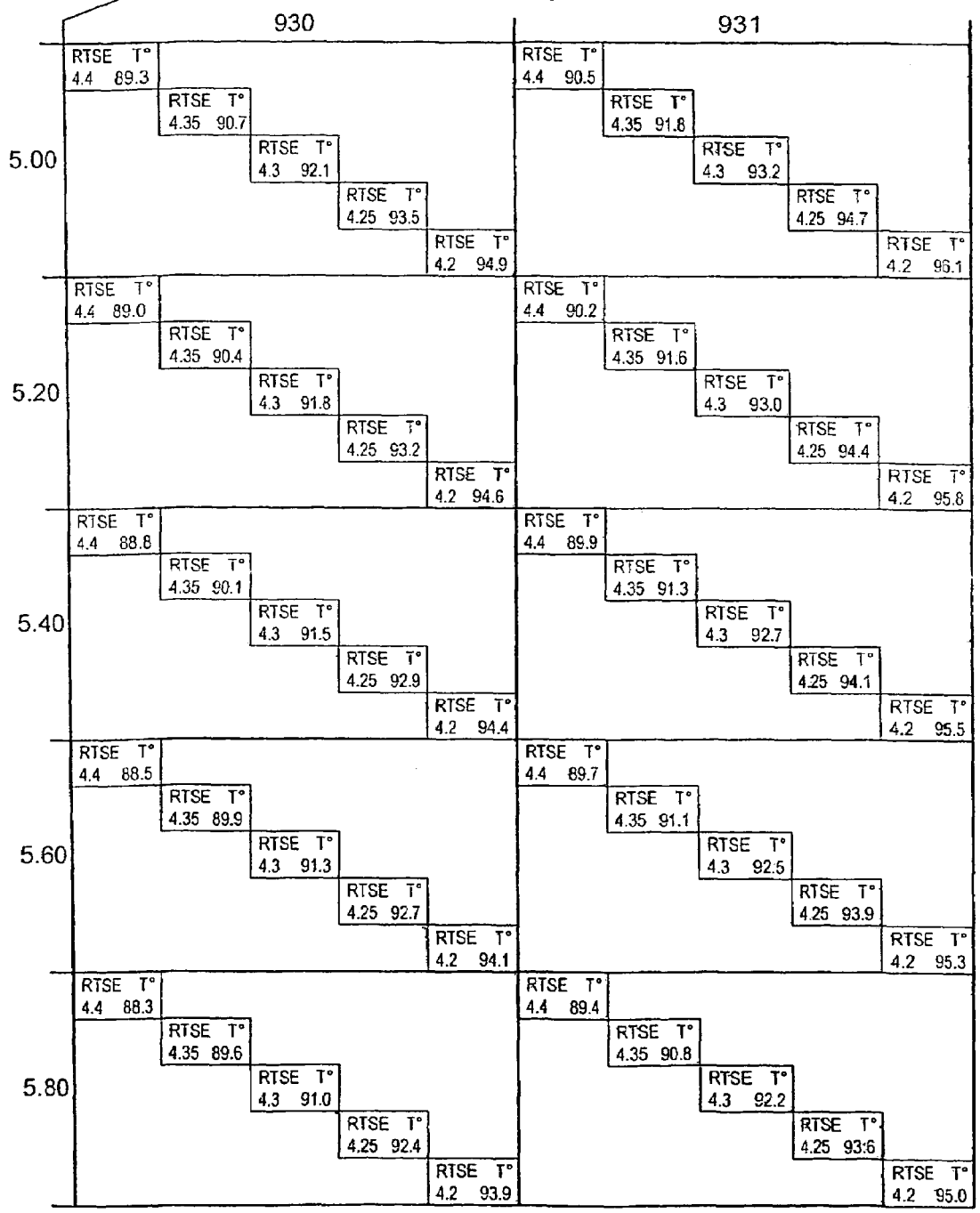
Figure 3B:
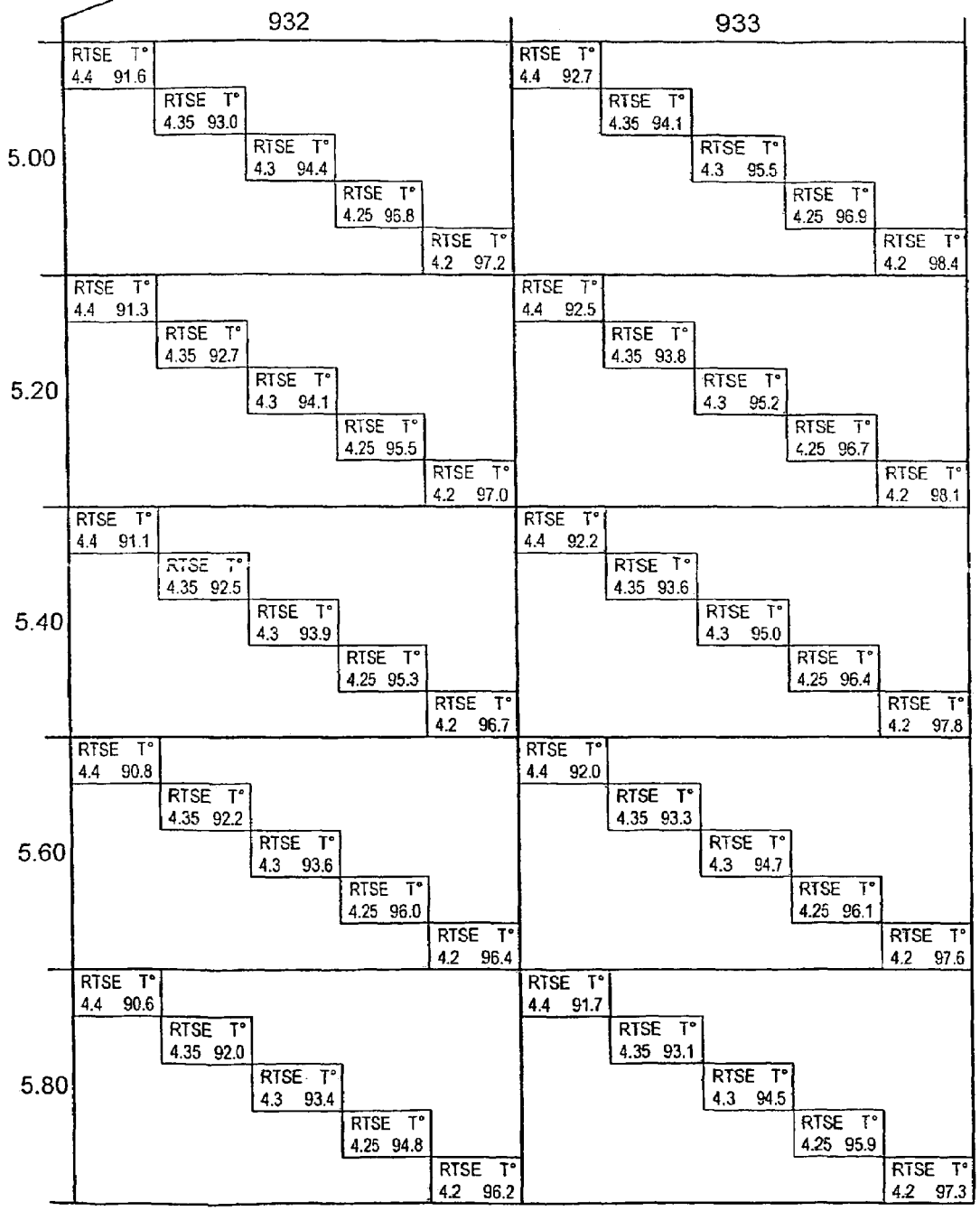
Figure 4A:
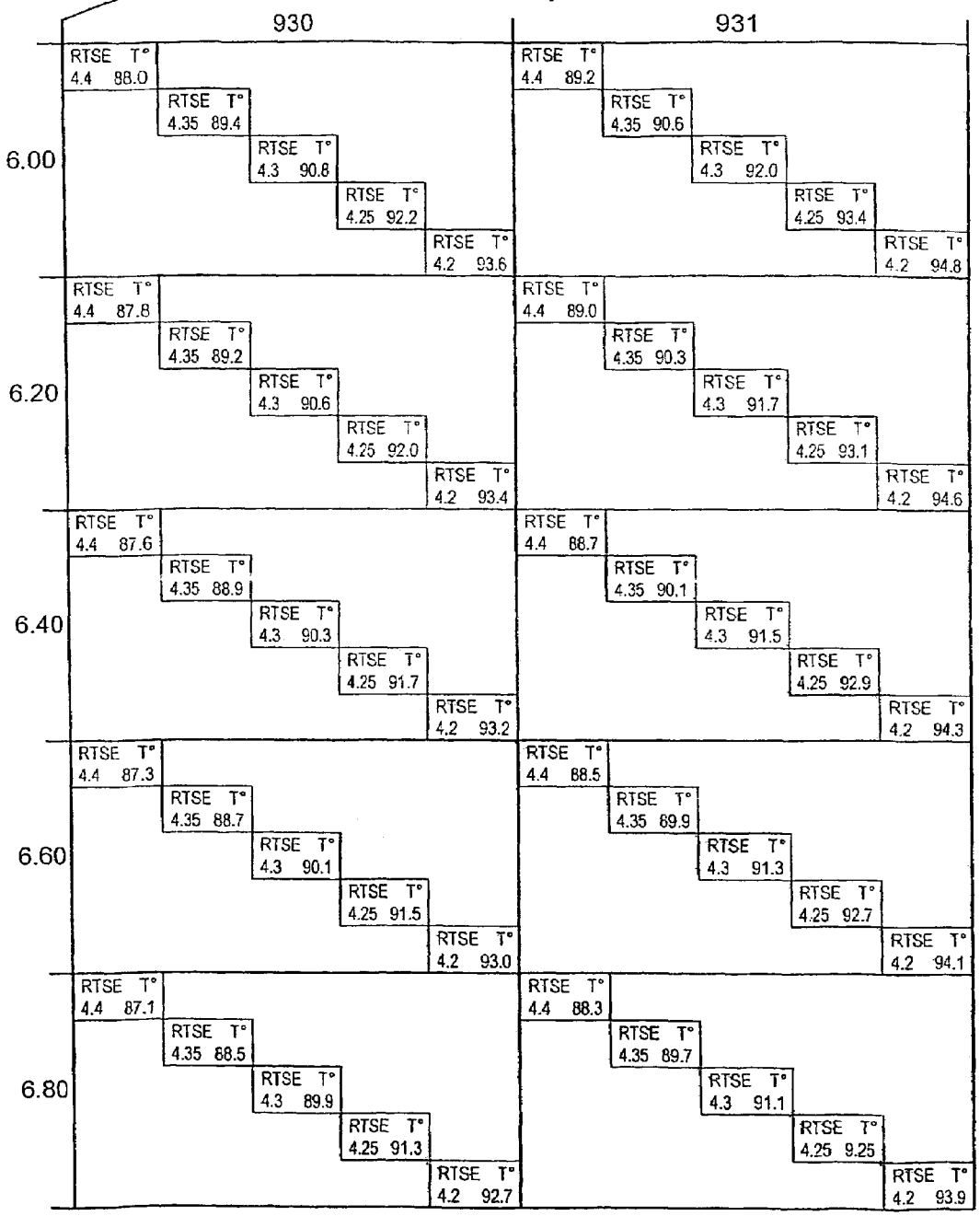
Figure 4B:
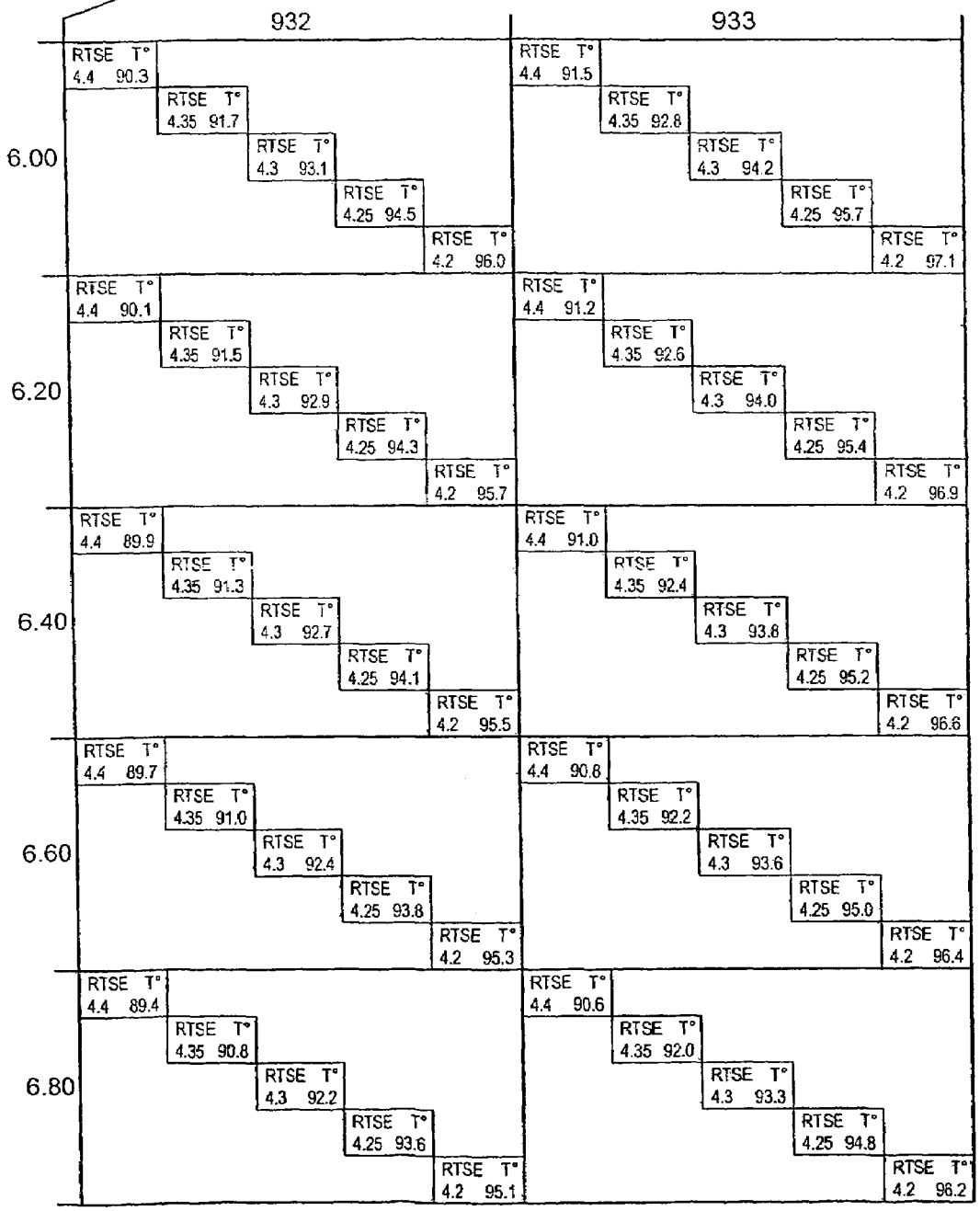
Figure 5A:
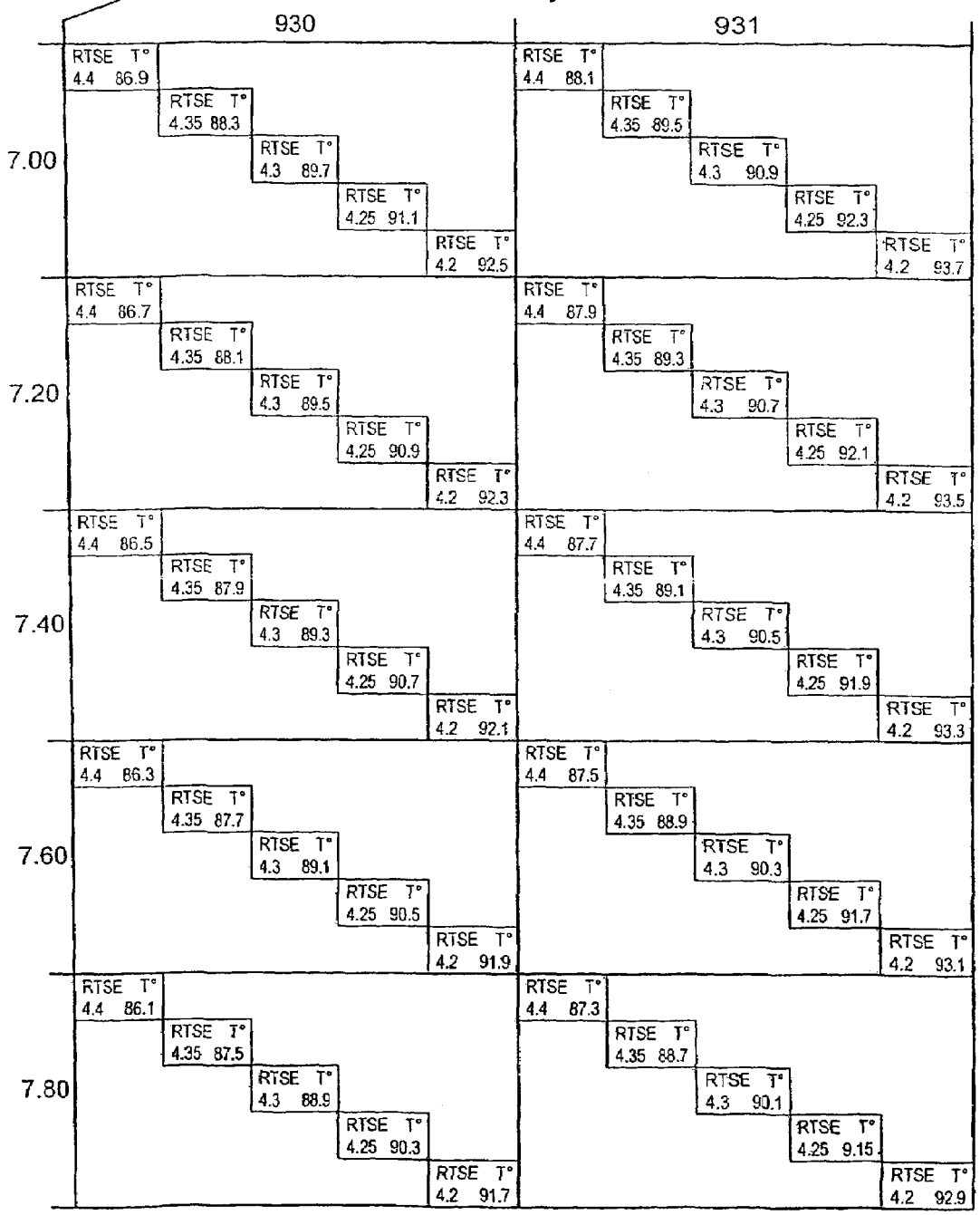
Figure 5B:
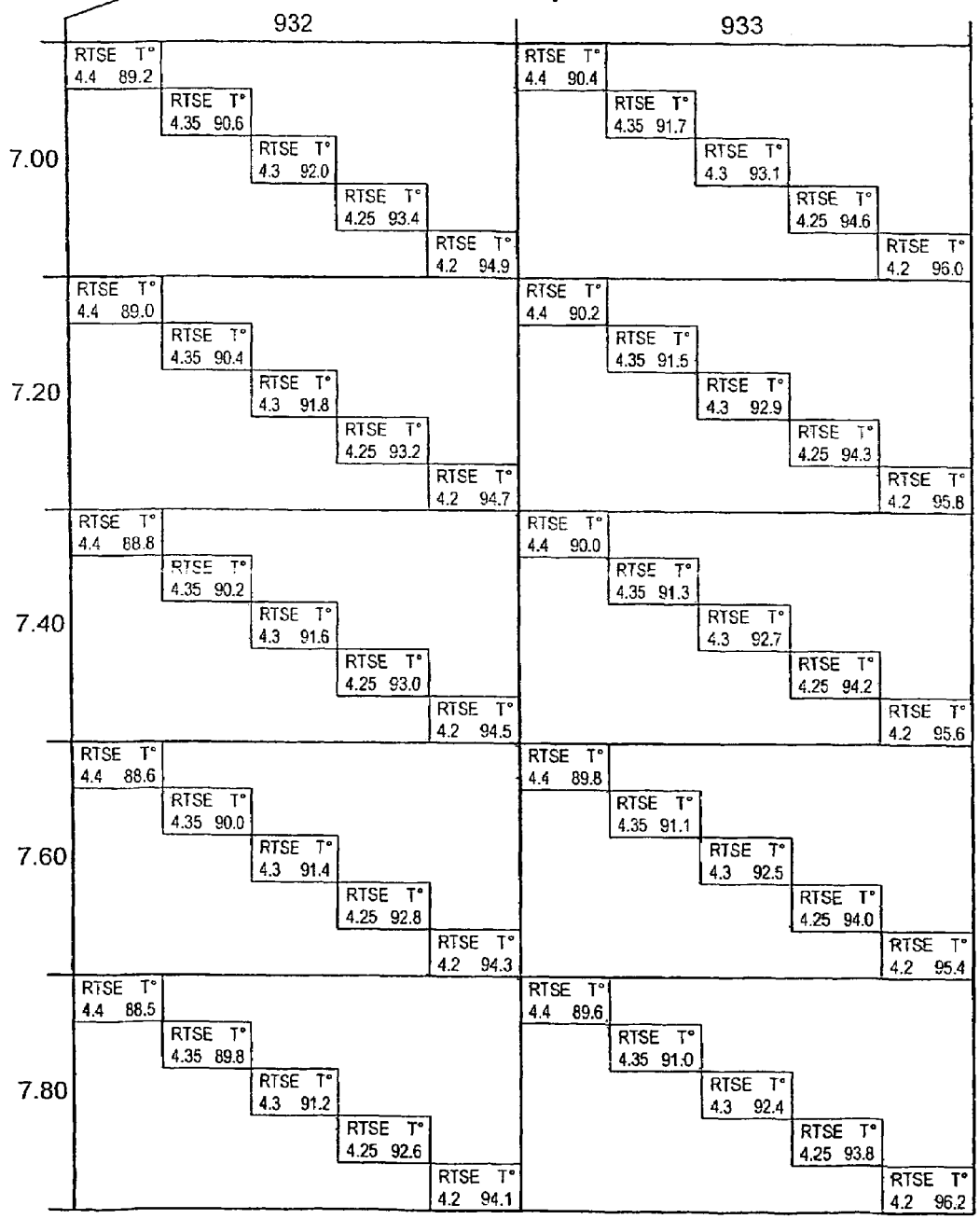
Figure 6B:
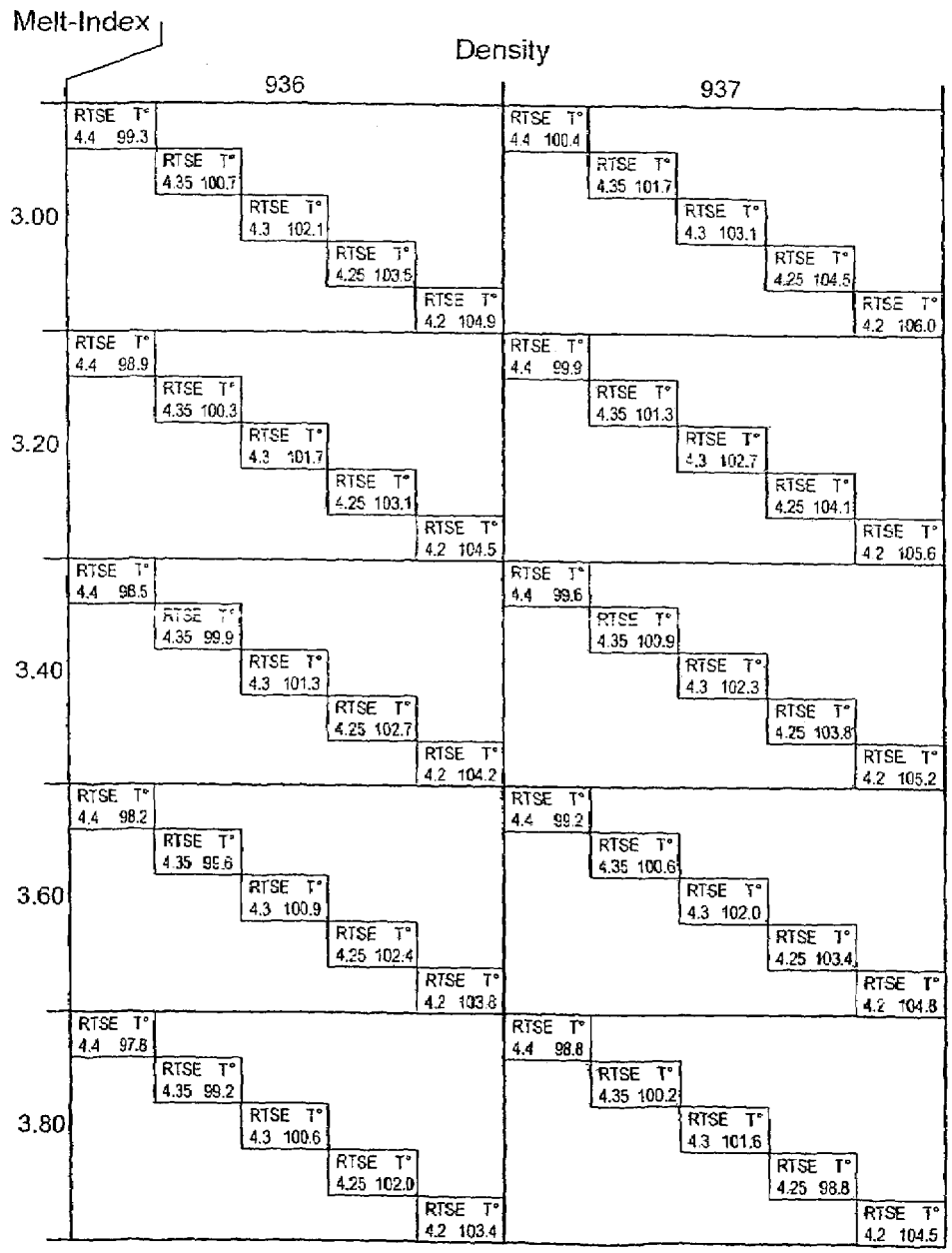
Figure 7A:
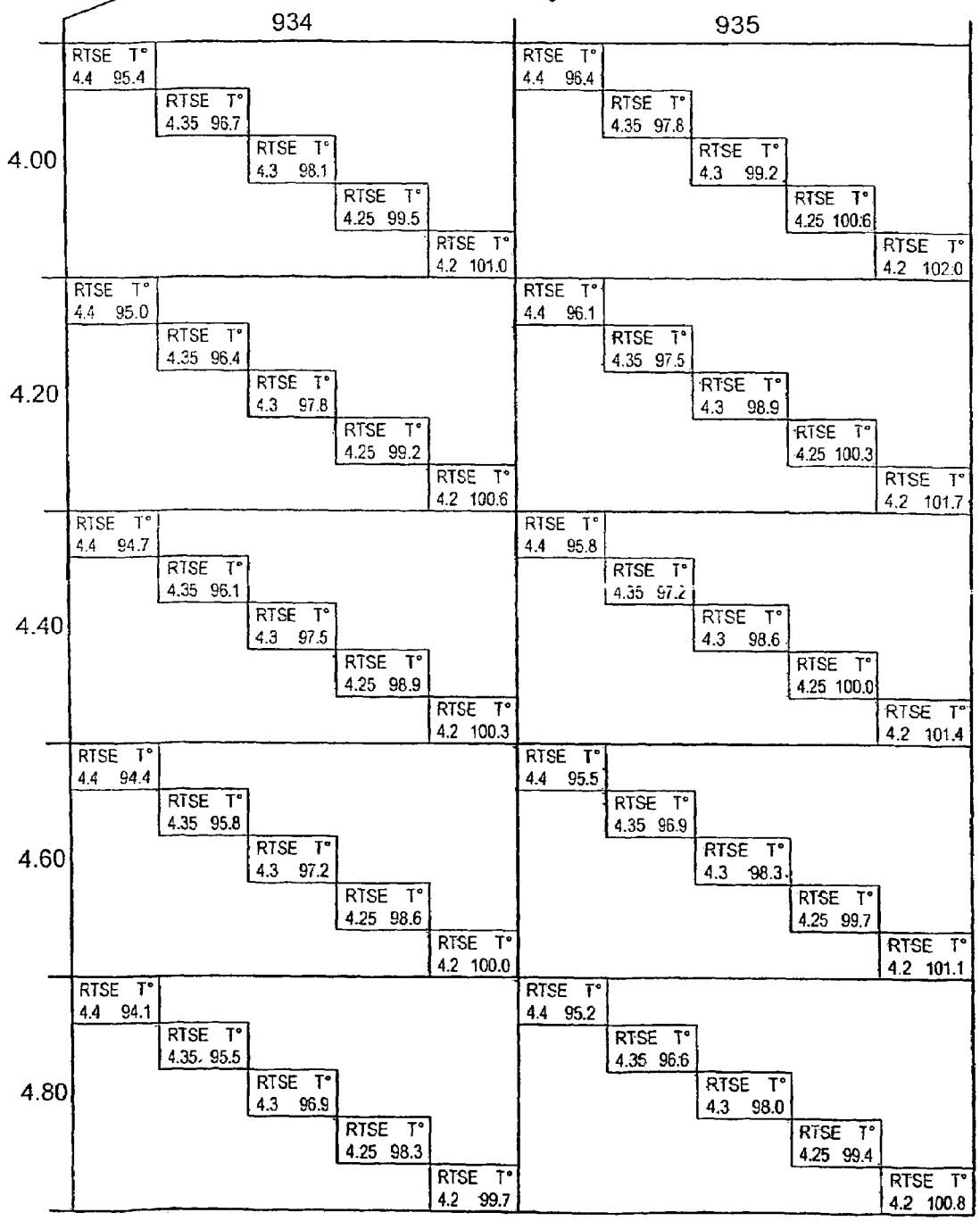
Figure 7B:
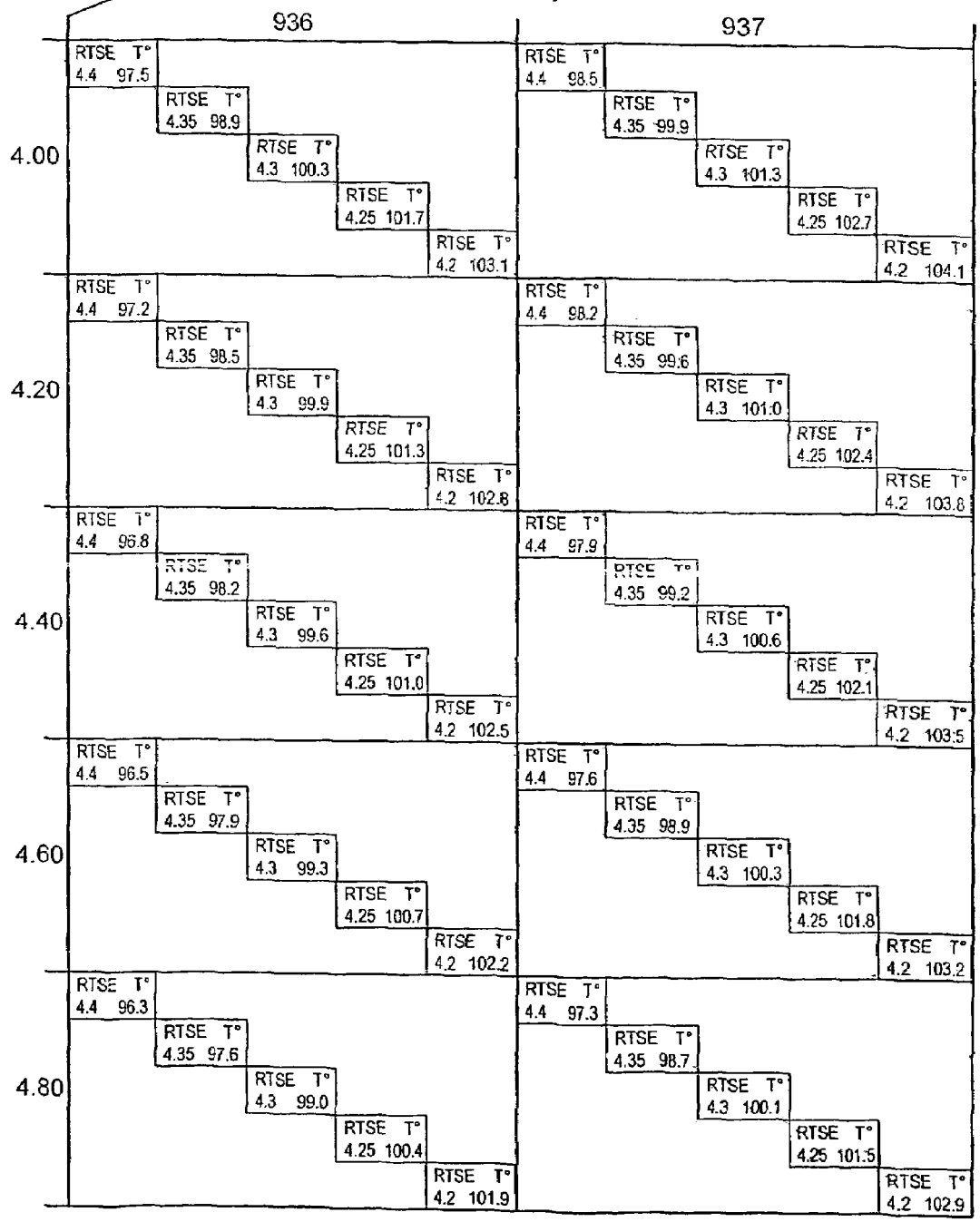
Figure 9B:
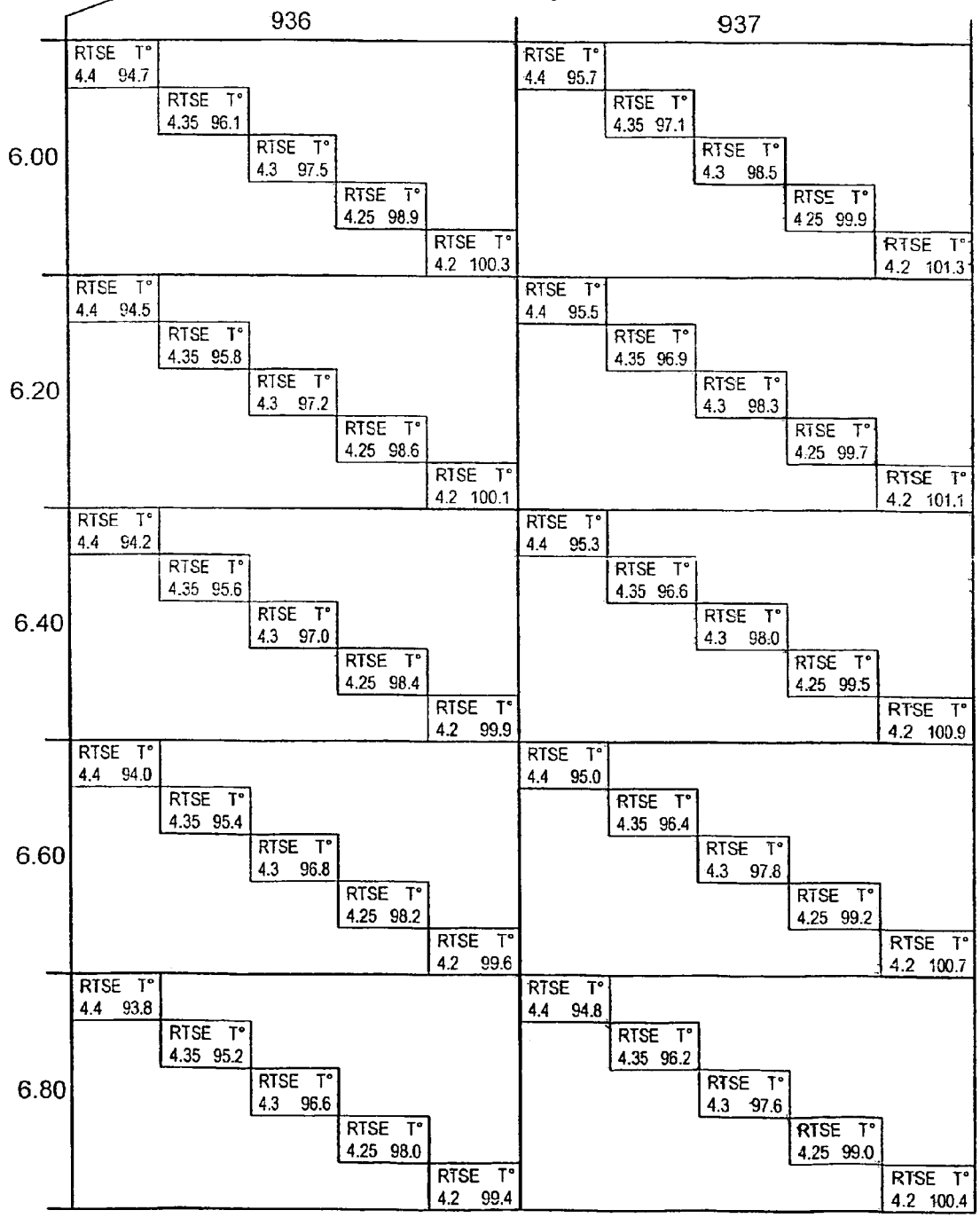
Figure 10A:
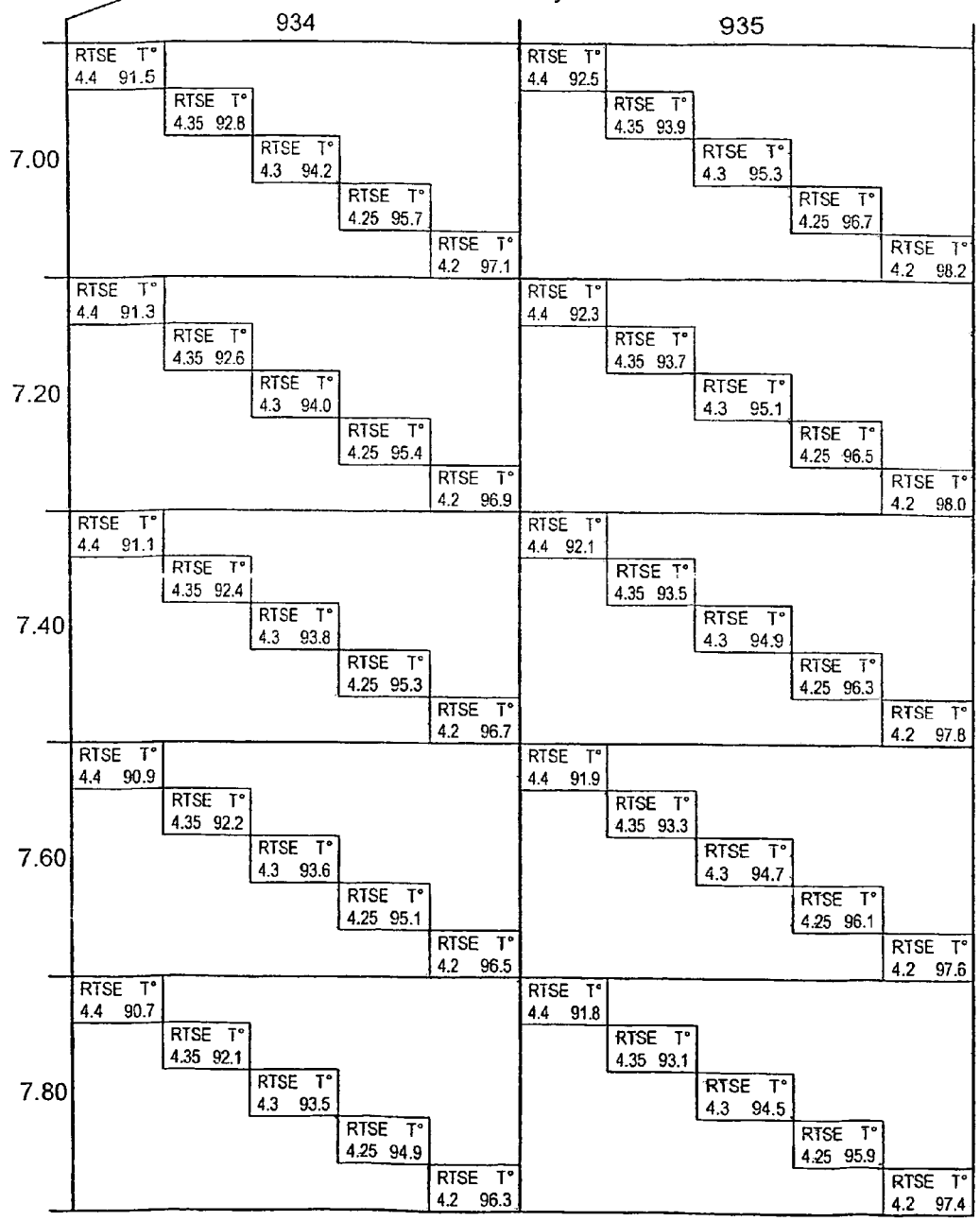
Figure 10B:
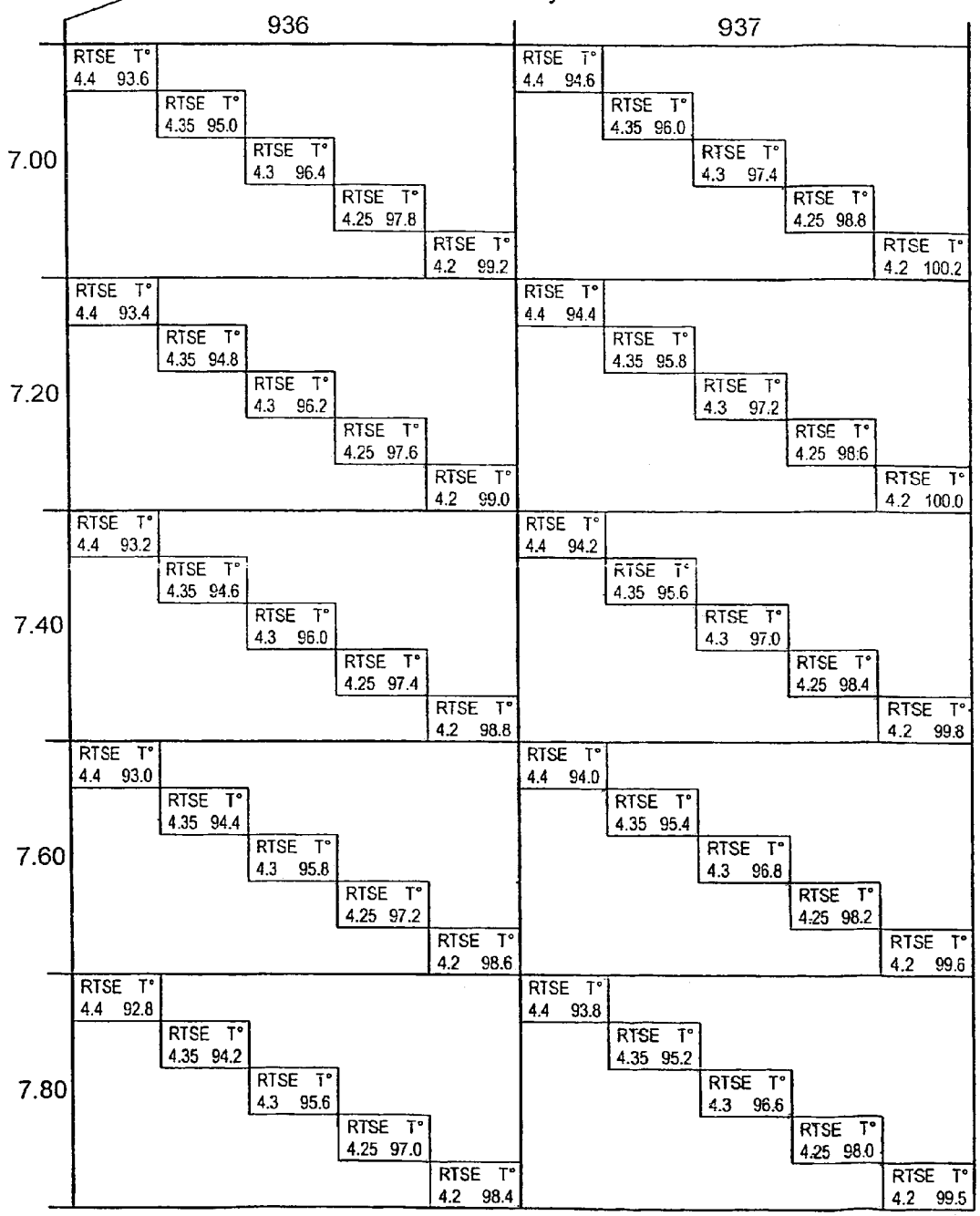
Figure 11A:
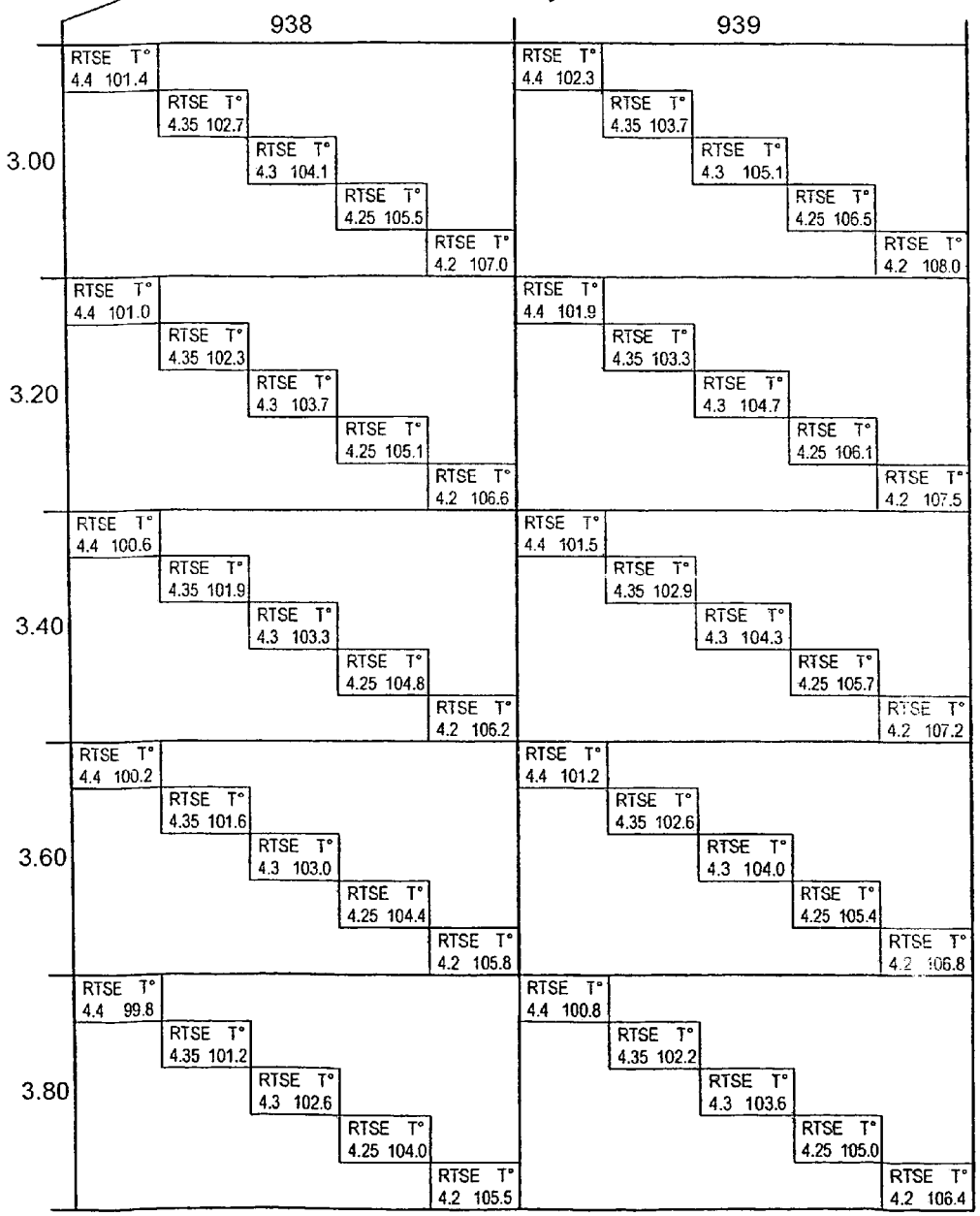
Figure 11B:
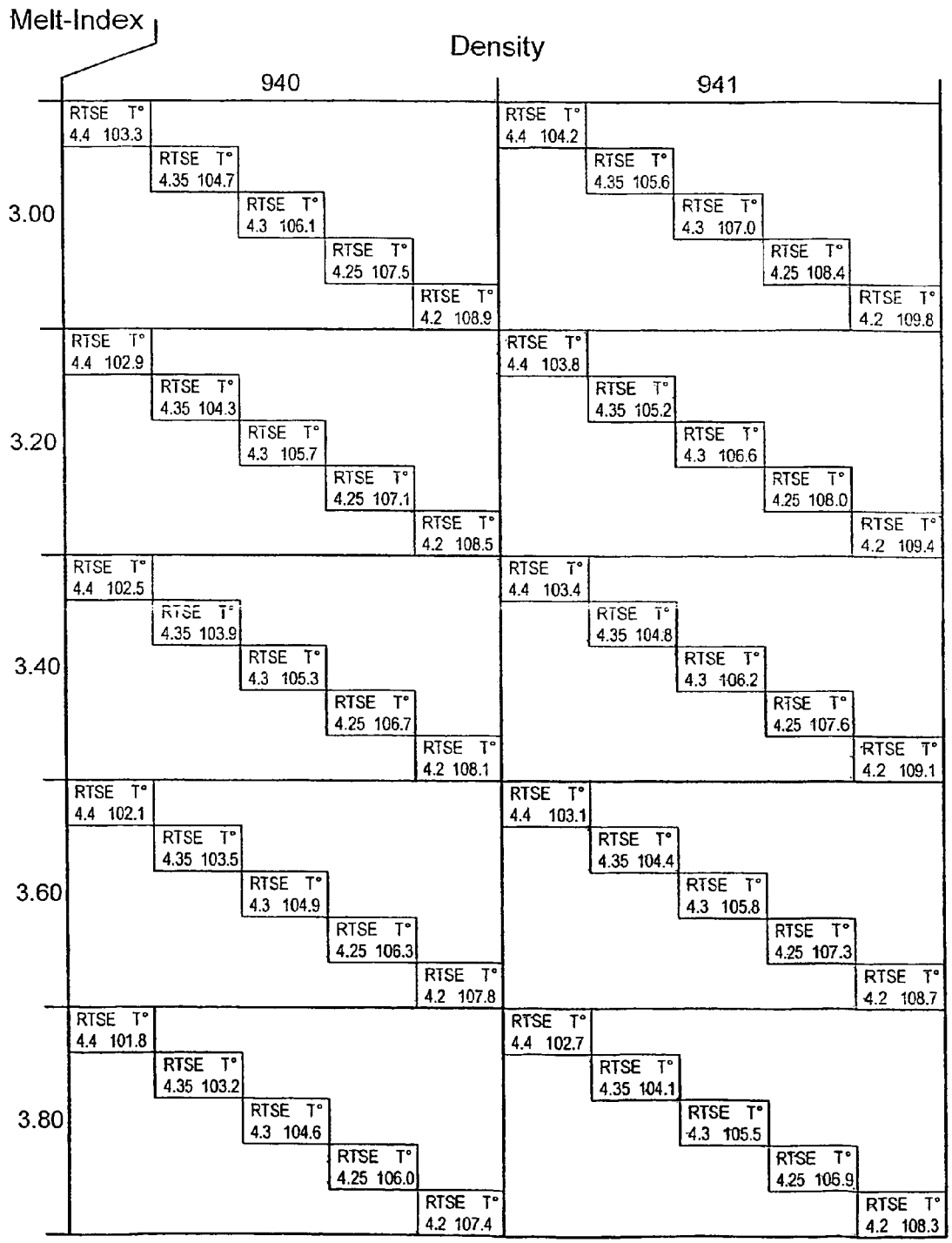
Figure 12A:
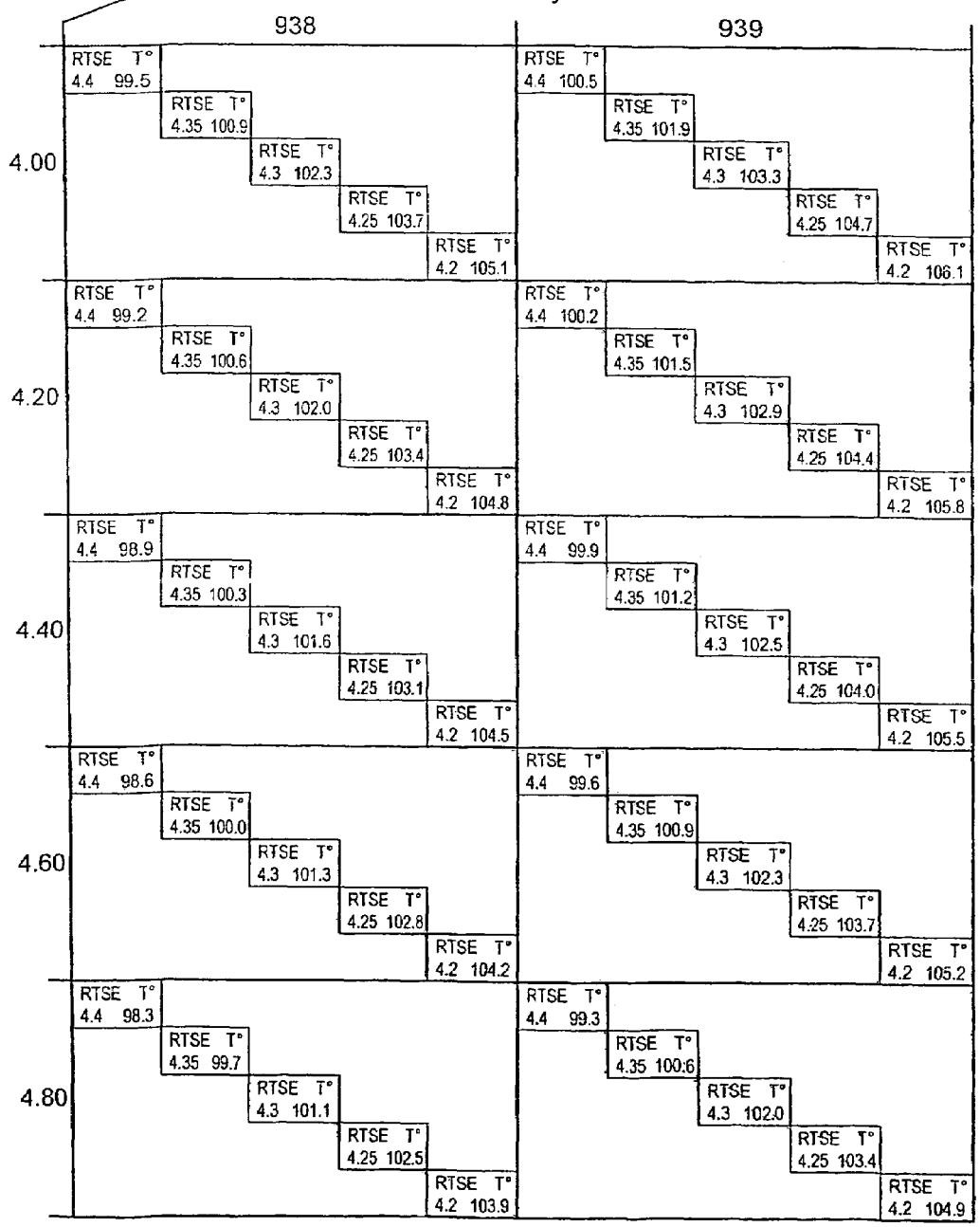
Figure 12B:
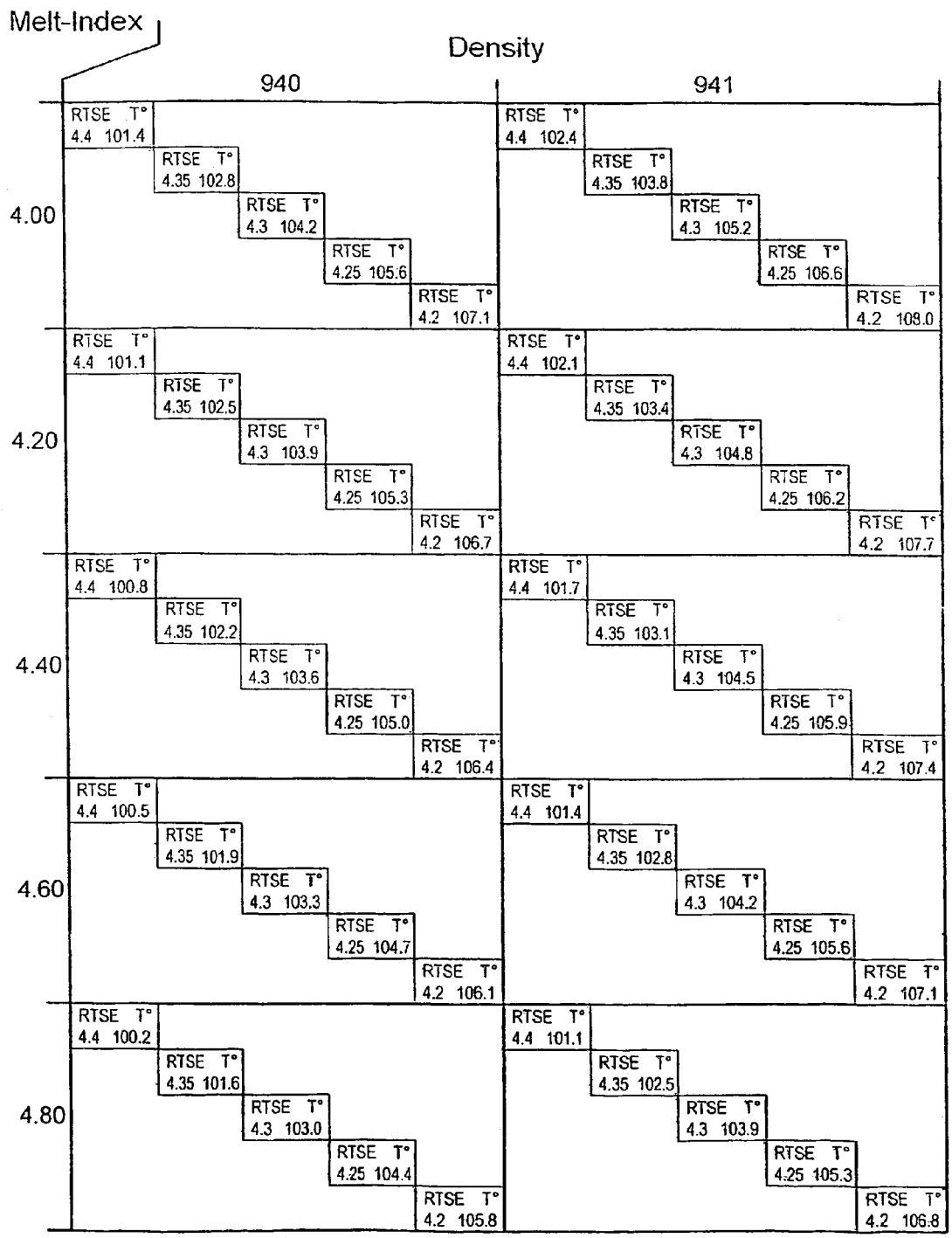
Figure 13A:
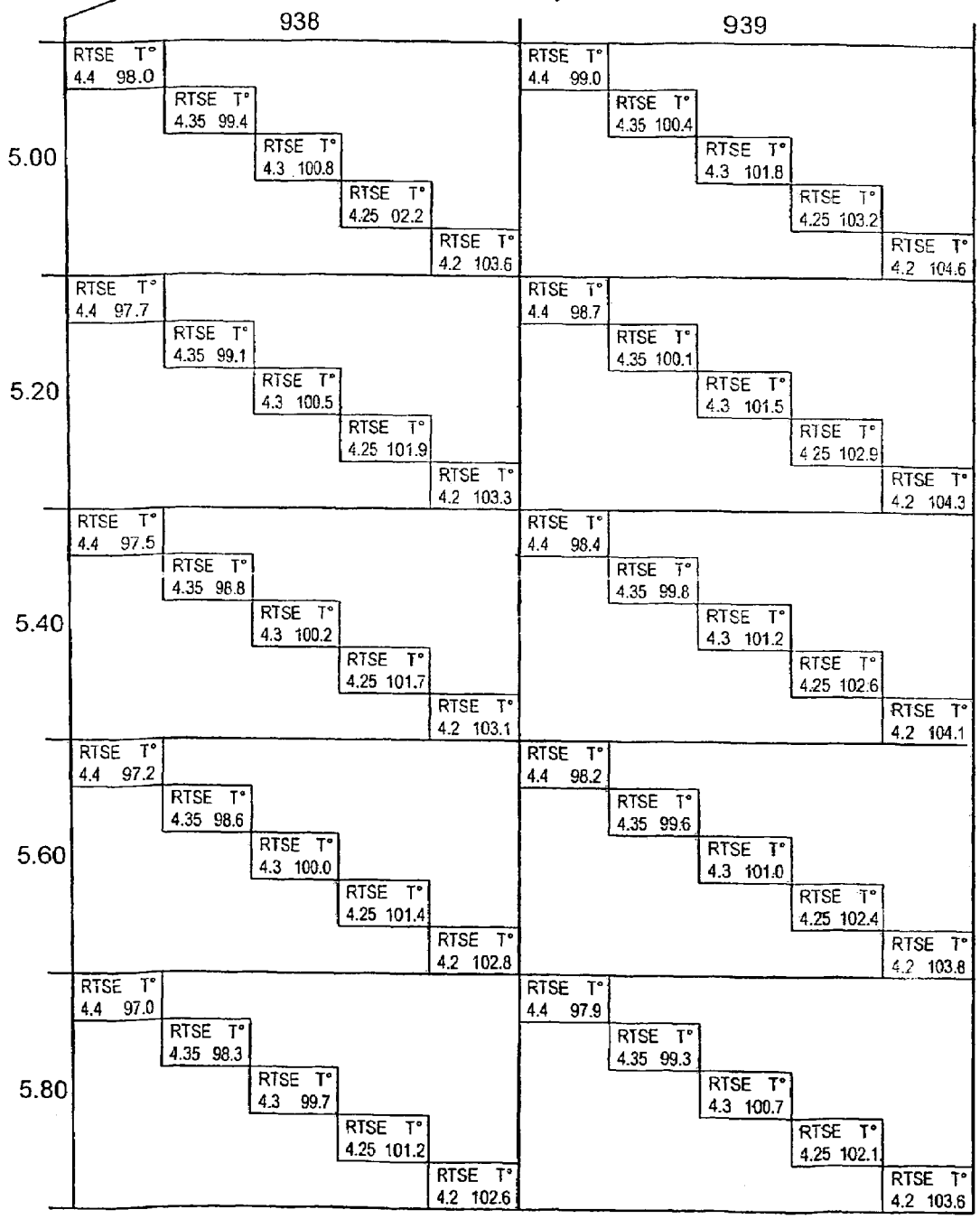
Figure 13B:
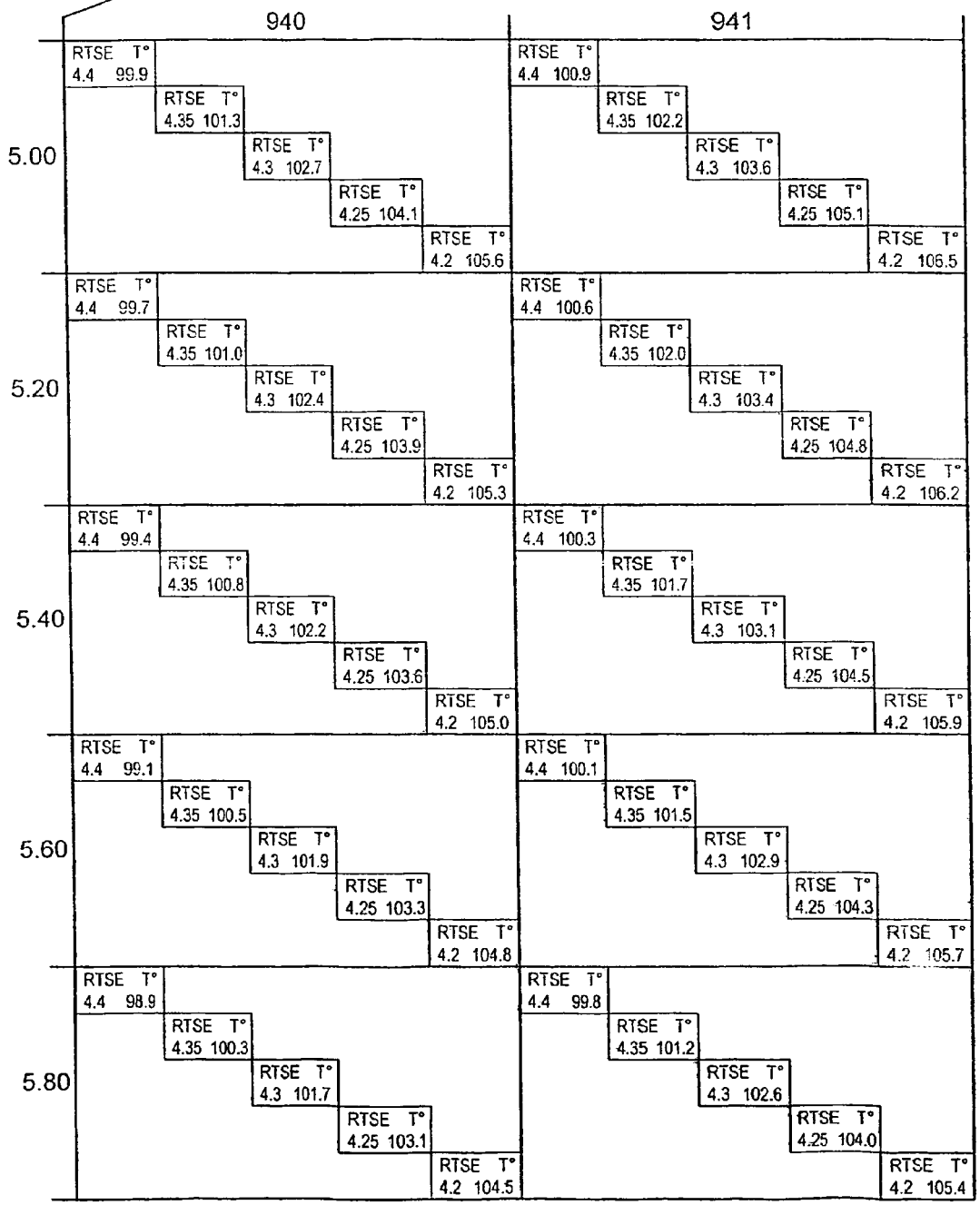
Figure 14A:
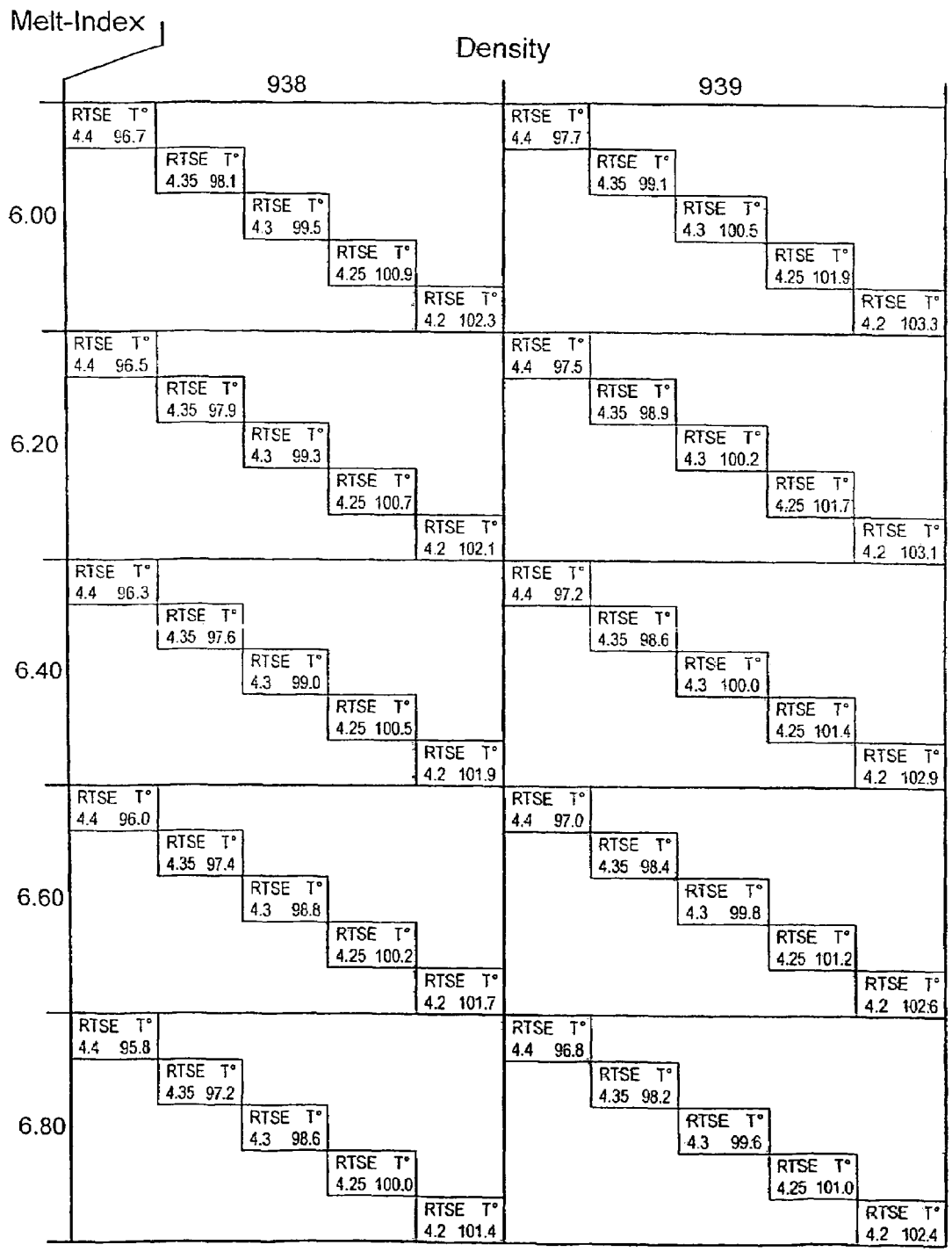
Figure 14B:
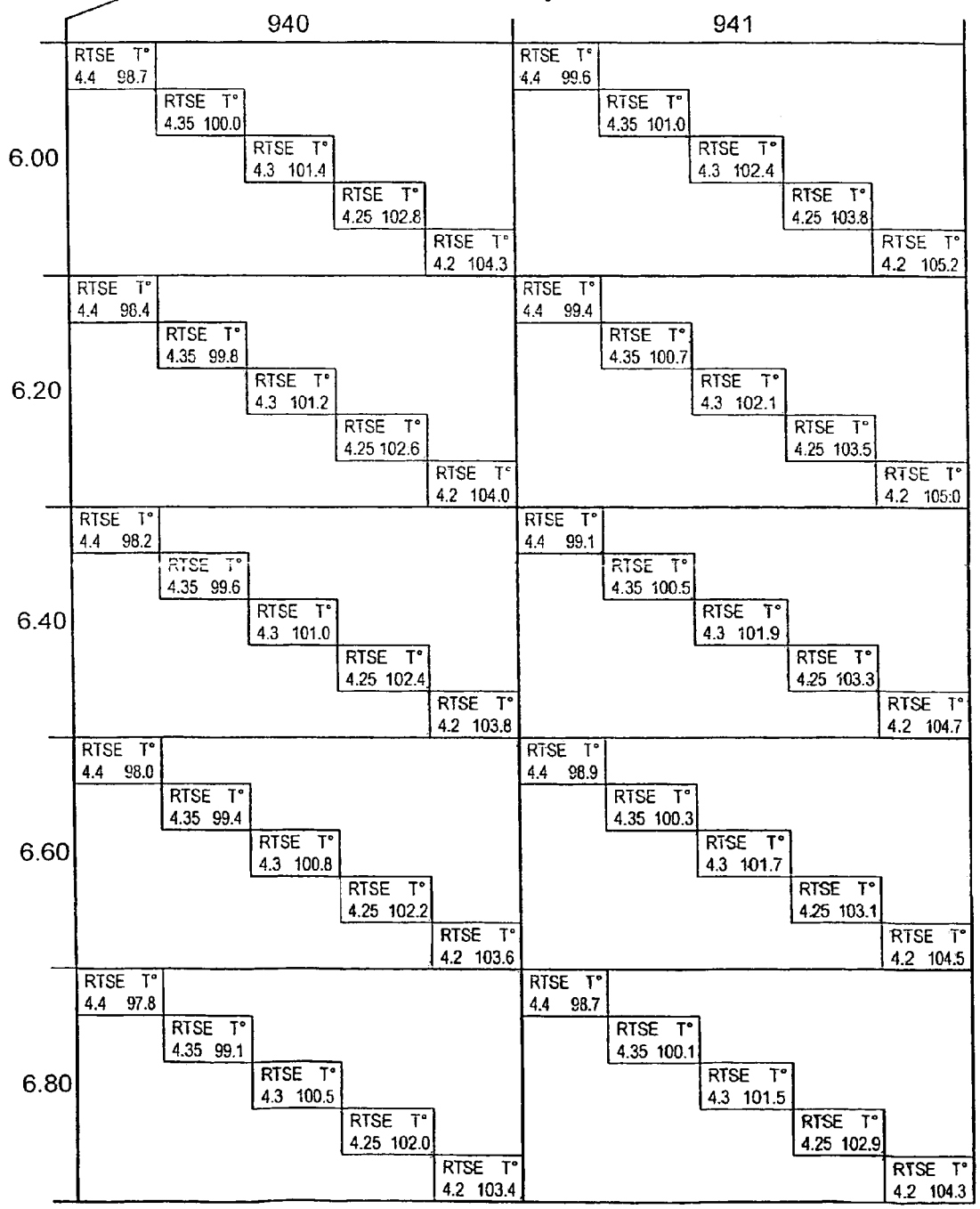
Figure 15A:
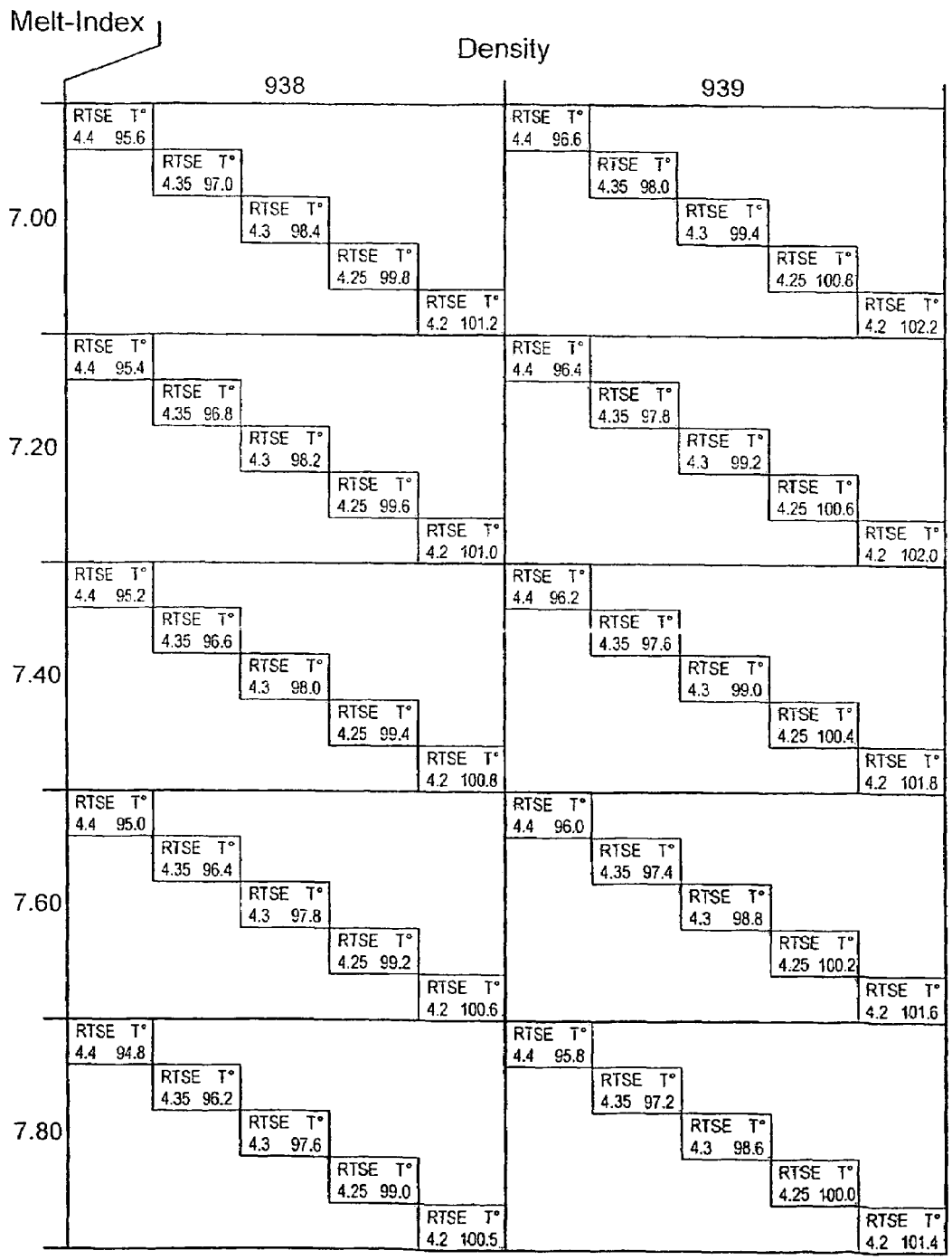
Figure 15B:
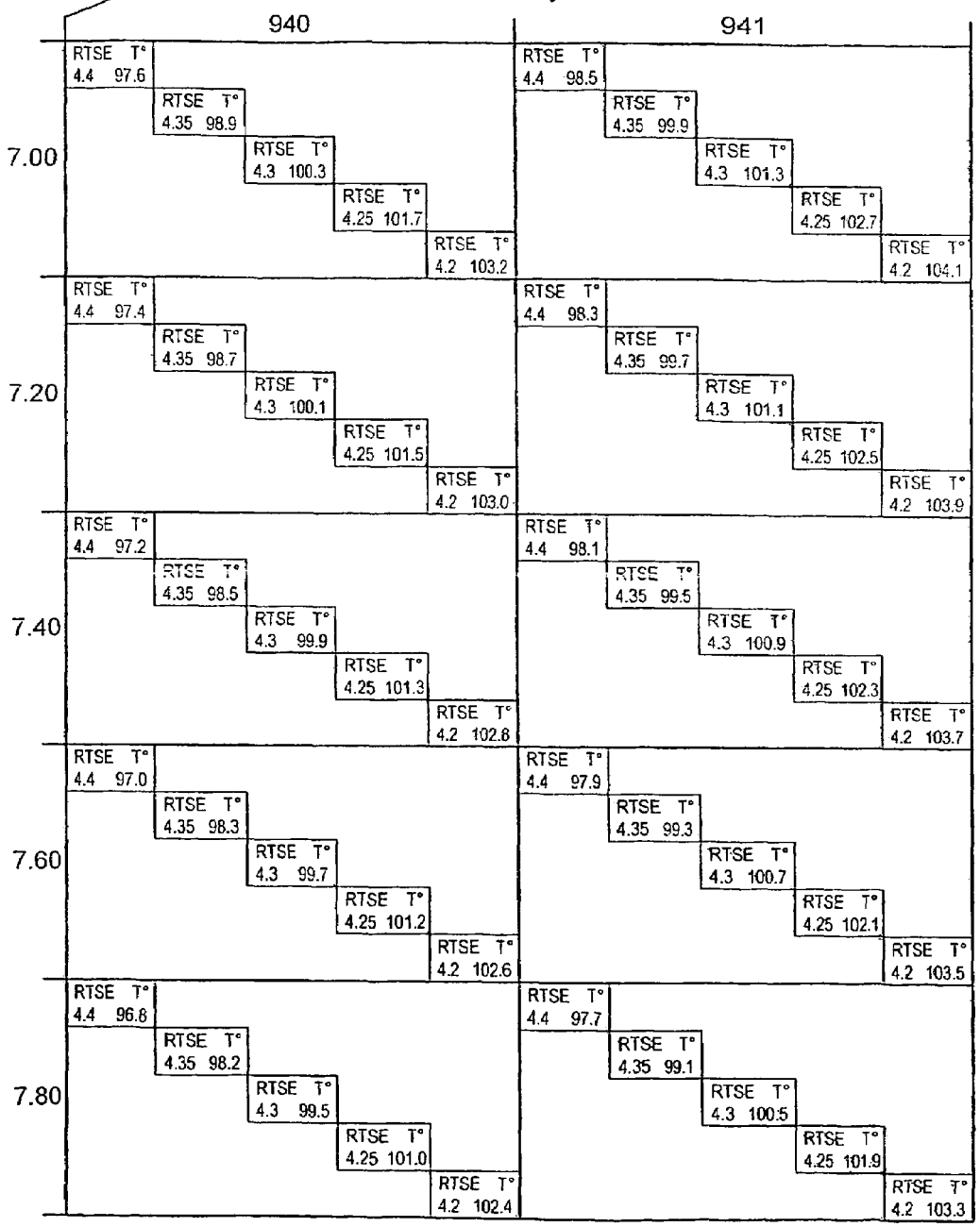
Figure 16A:
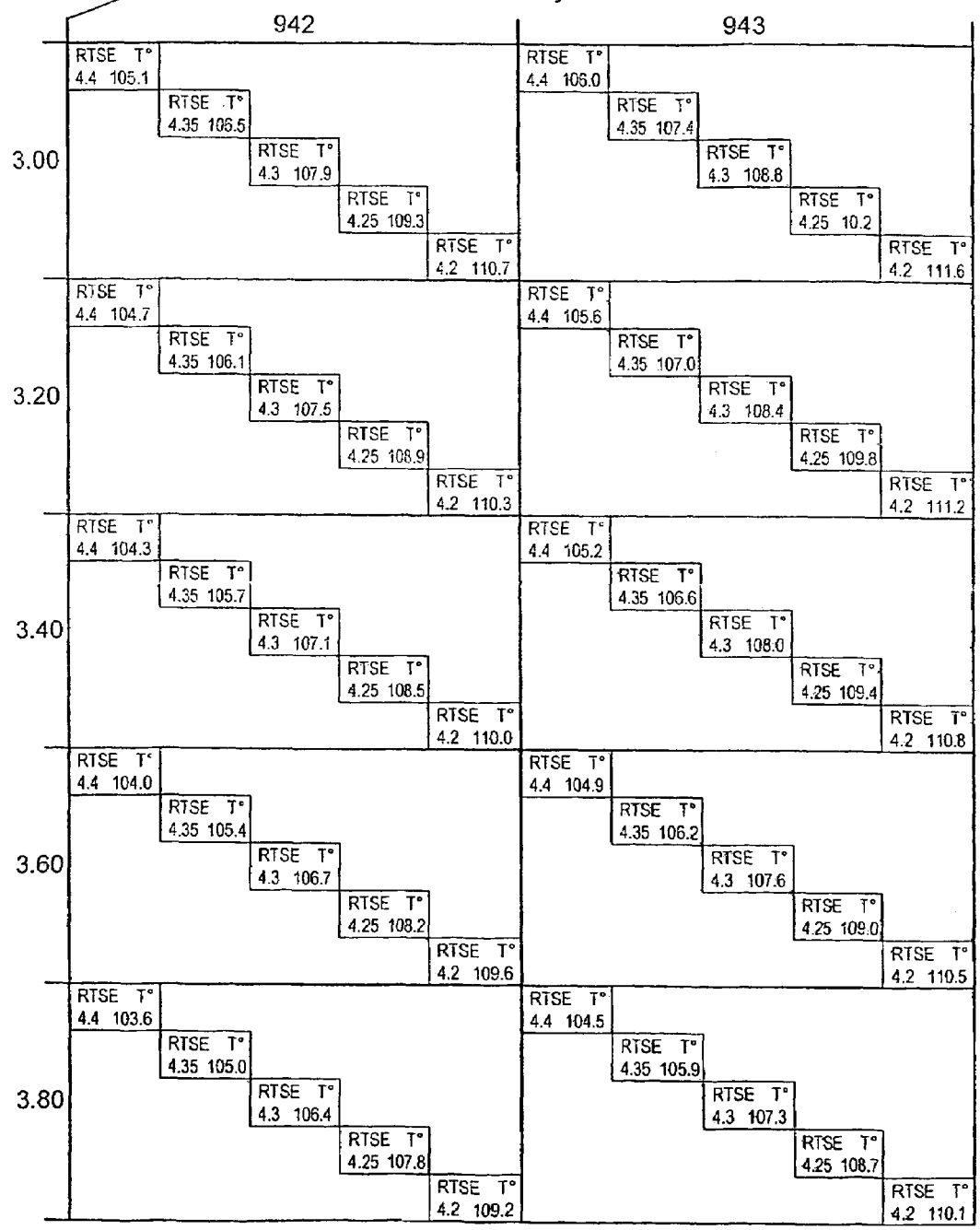
Figure 17A:
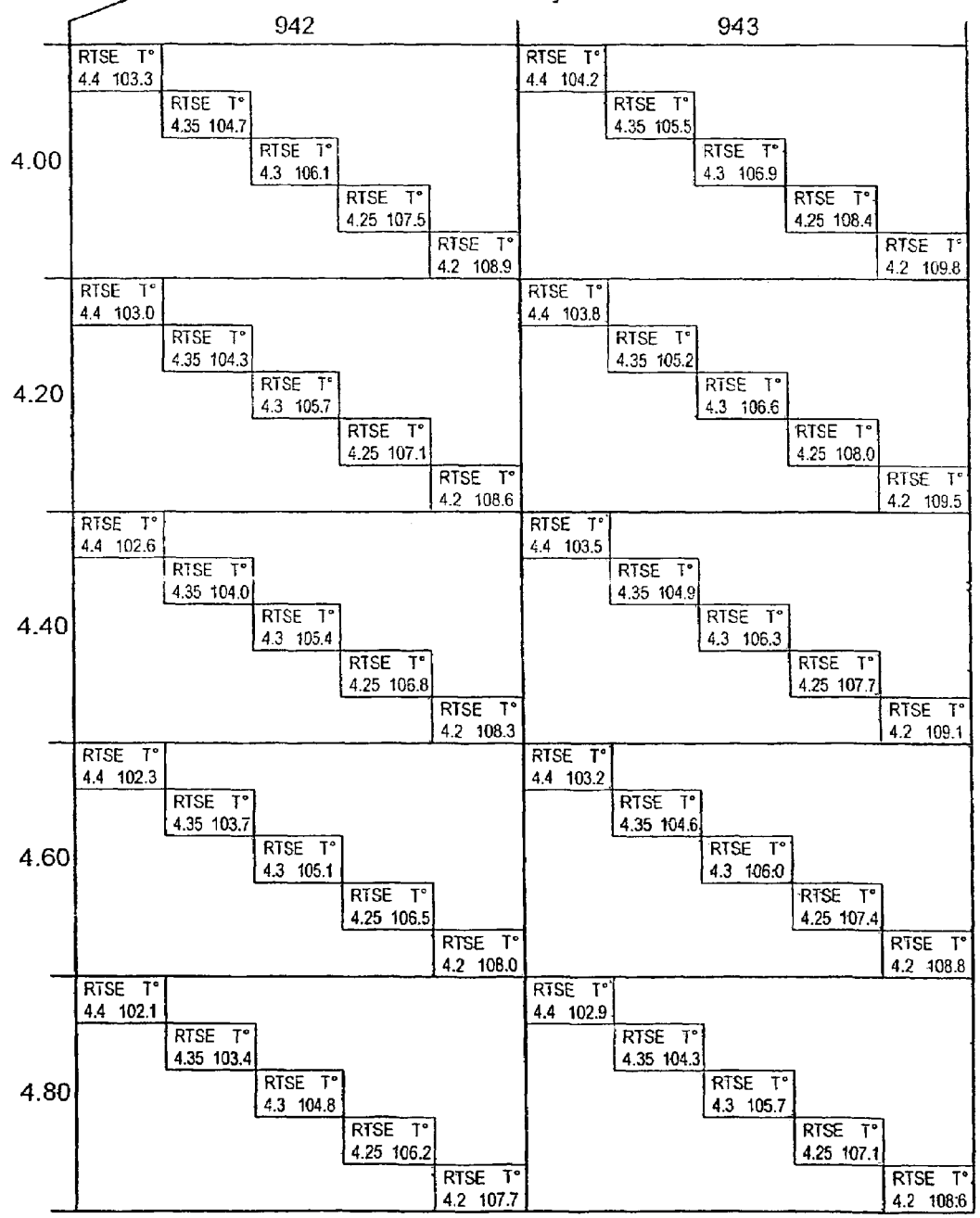
Figure 17B:
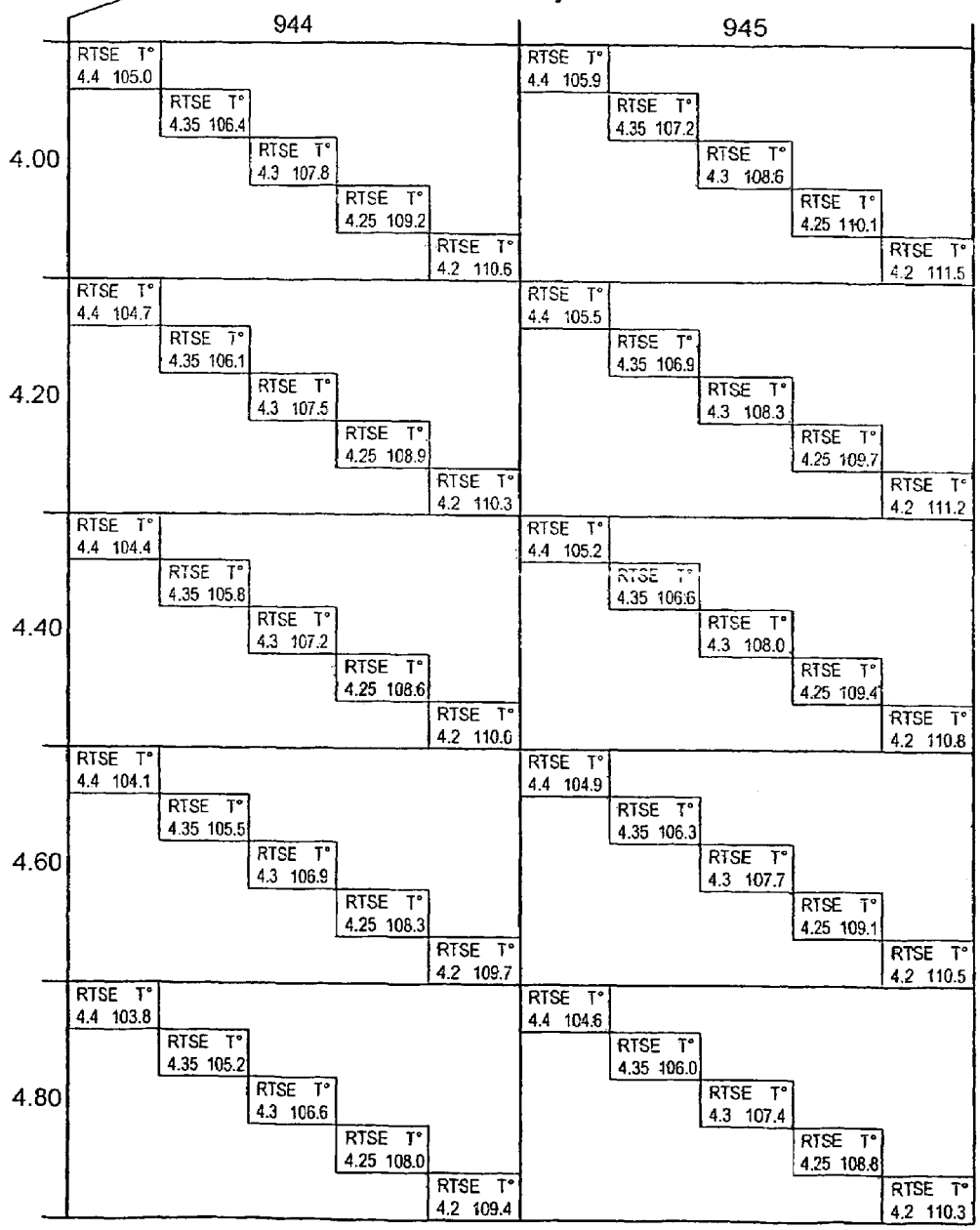
Figure 18A:
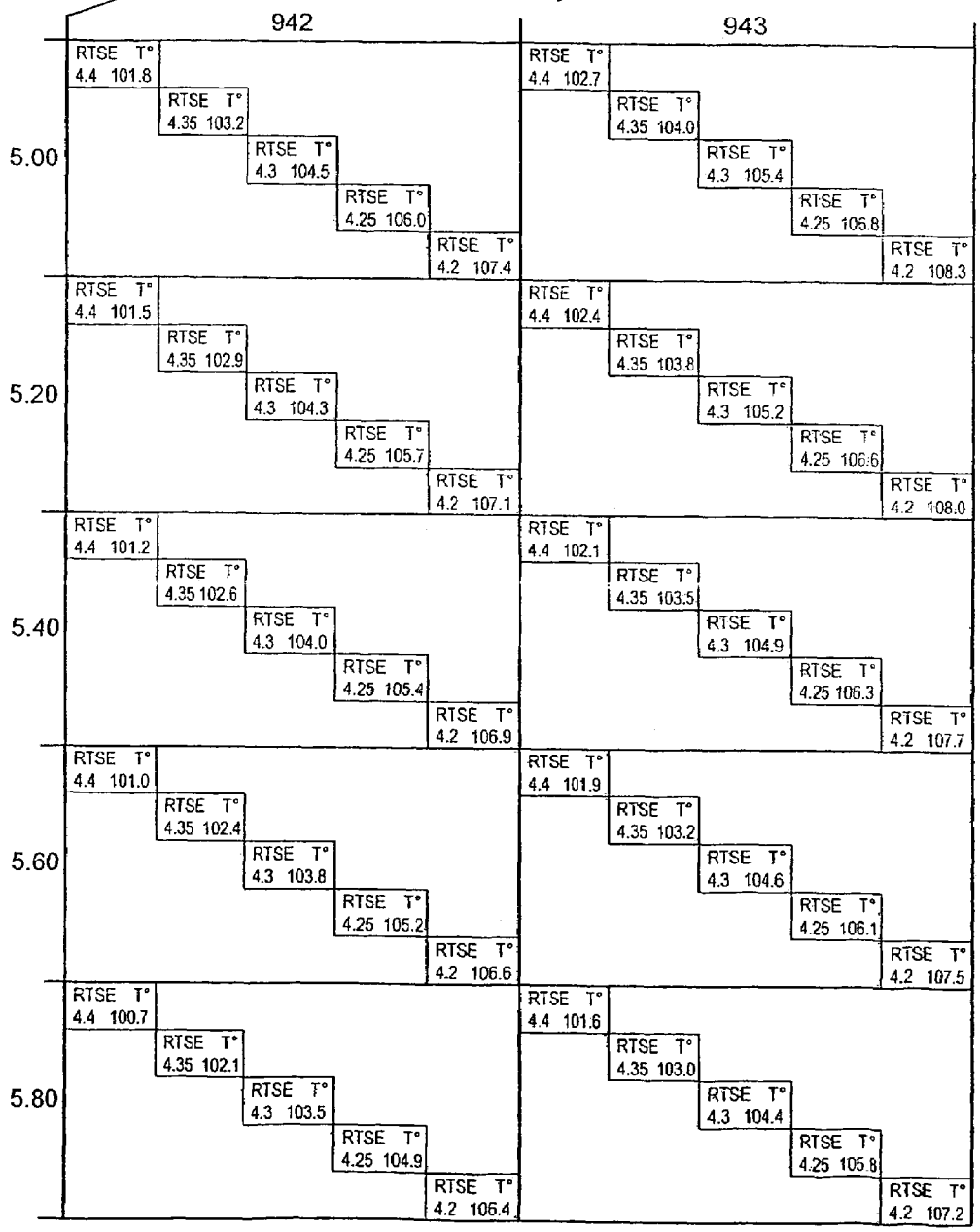
Figure 18B:
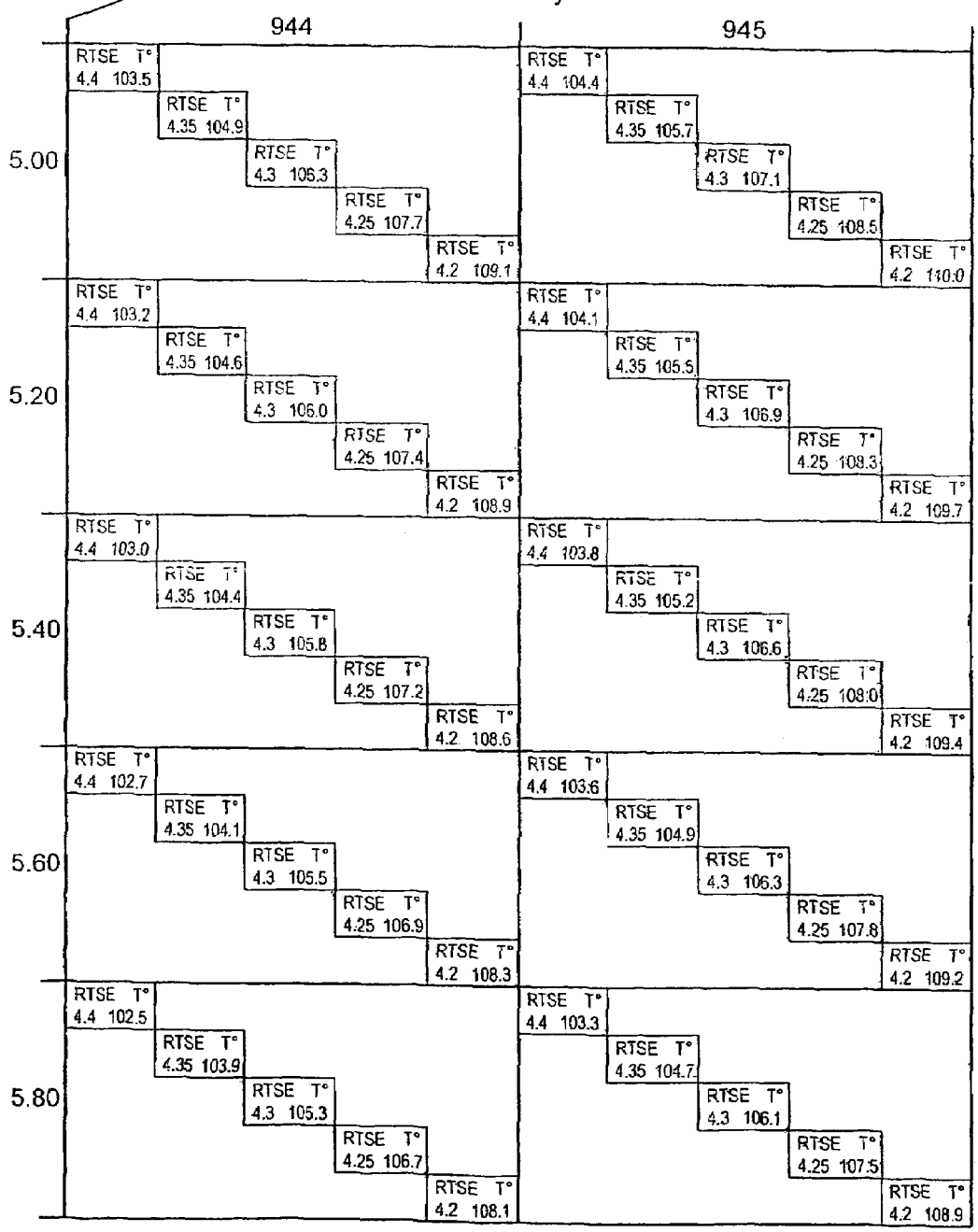
Figure 19A:
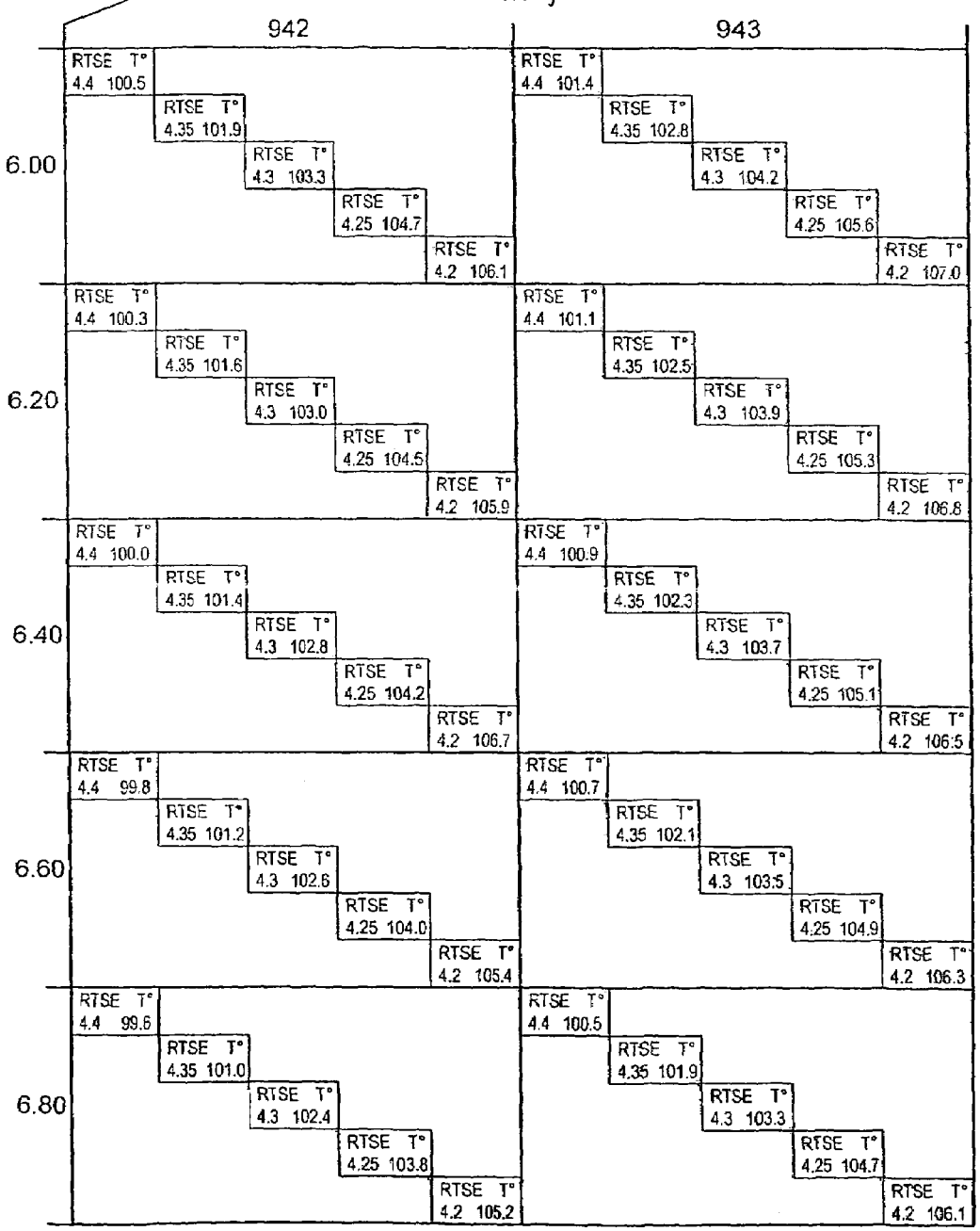
Figure 19B:
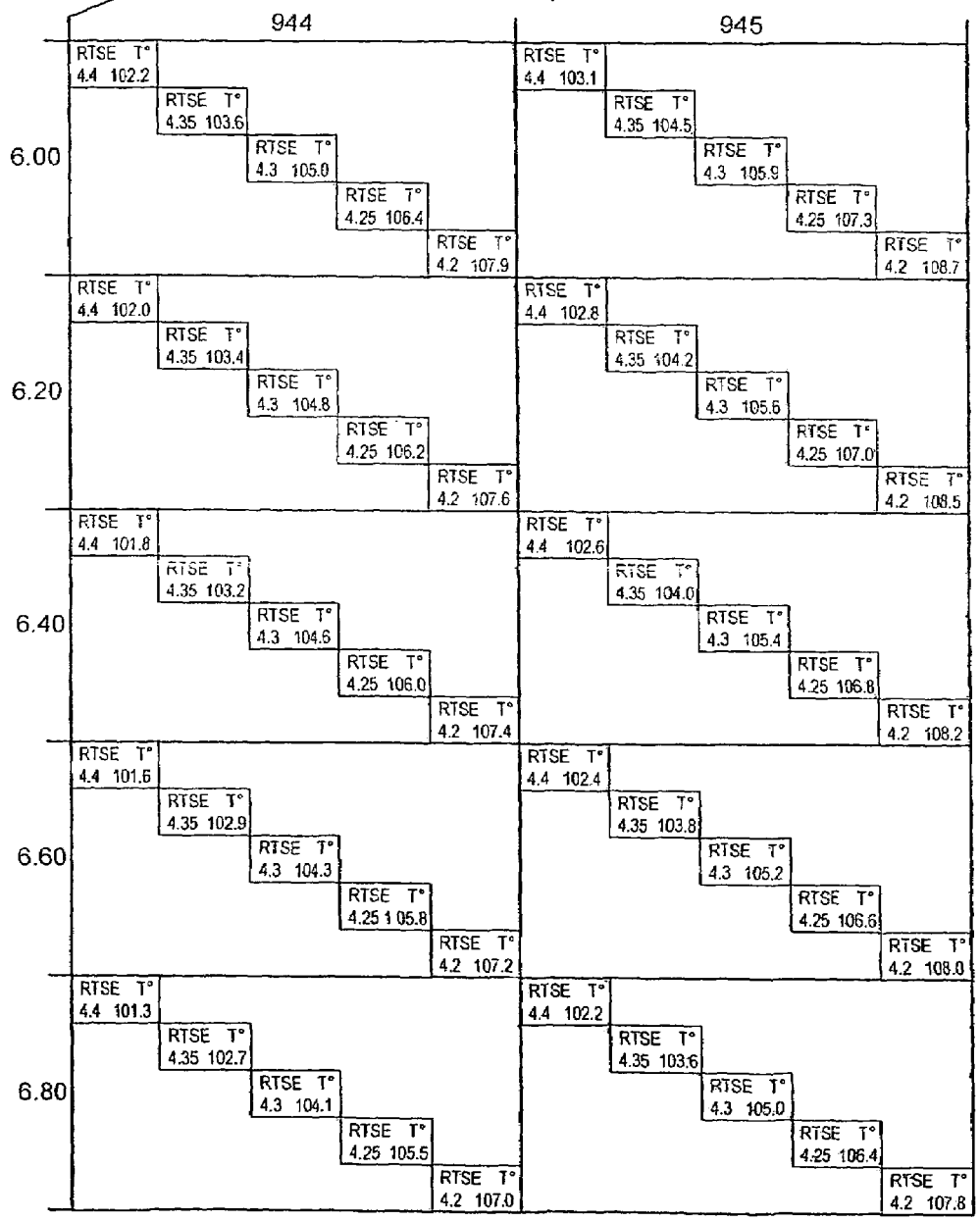
Figure 20A:
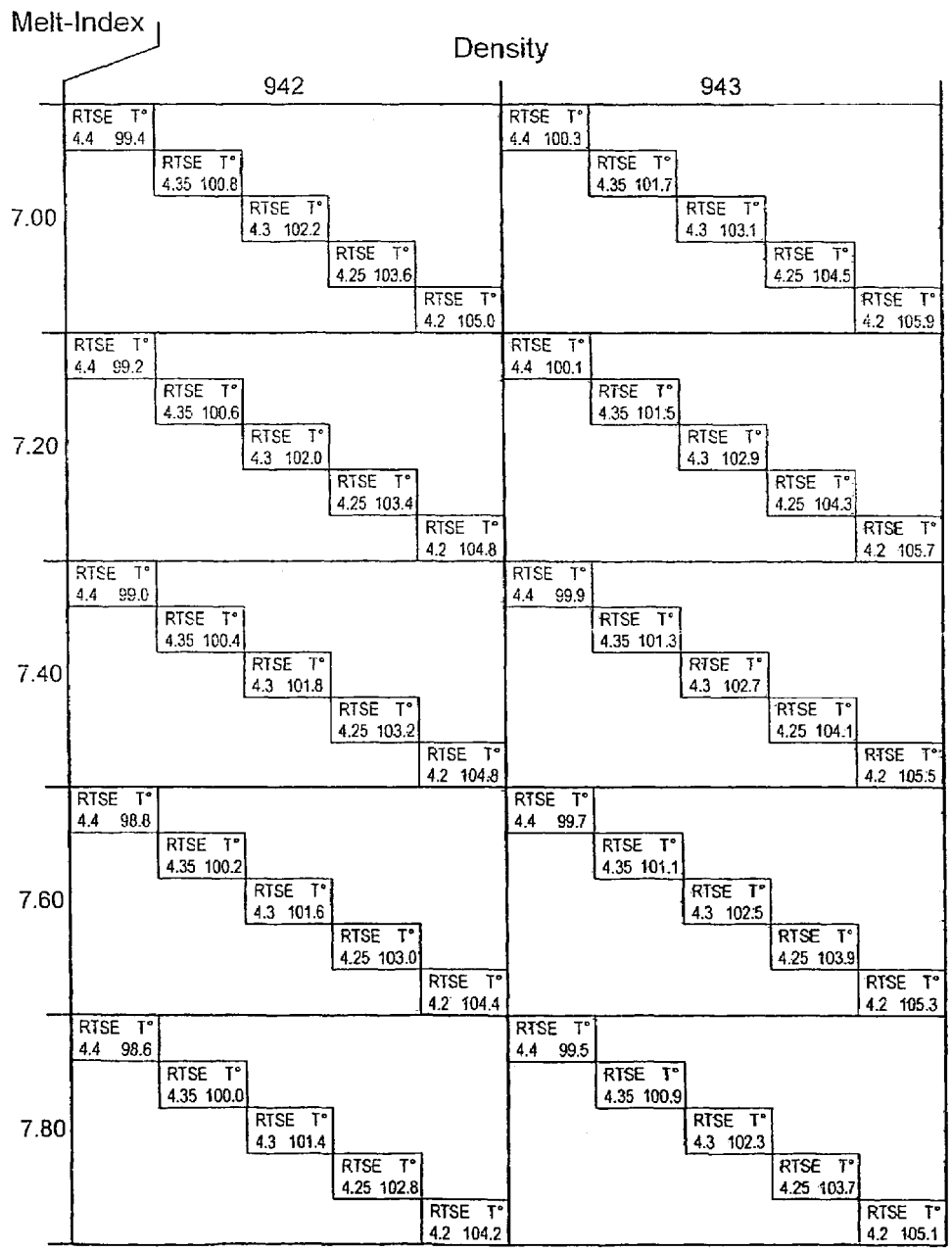
Figure 20B:
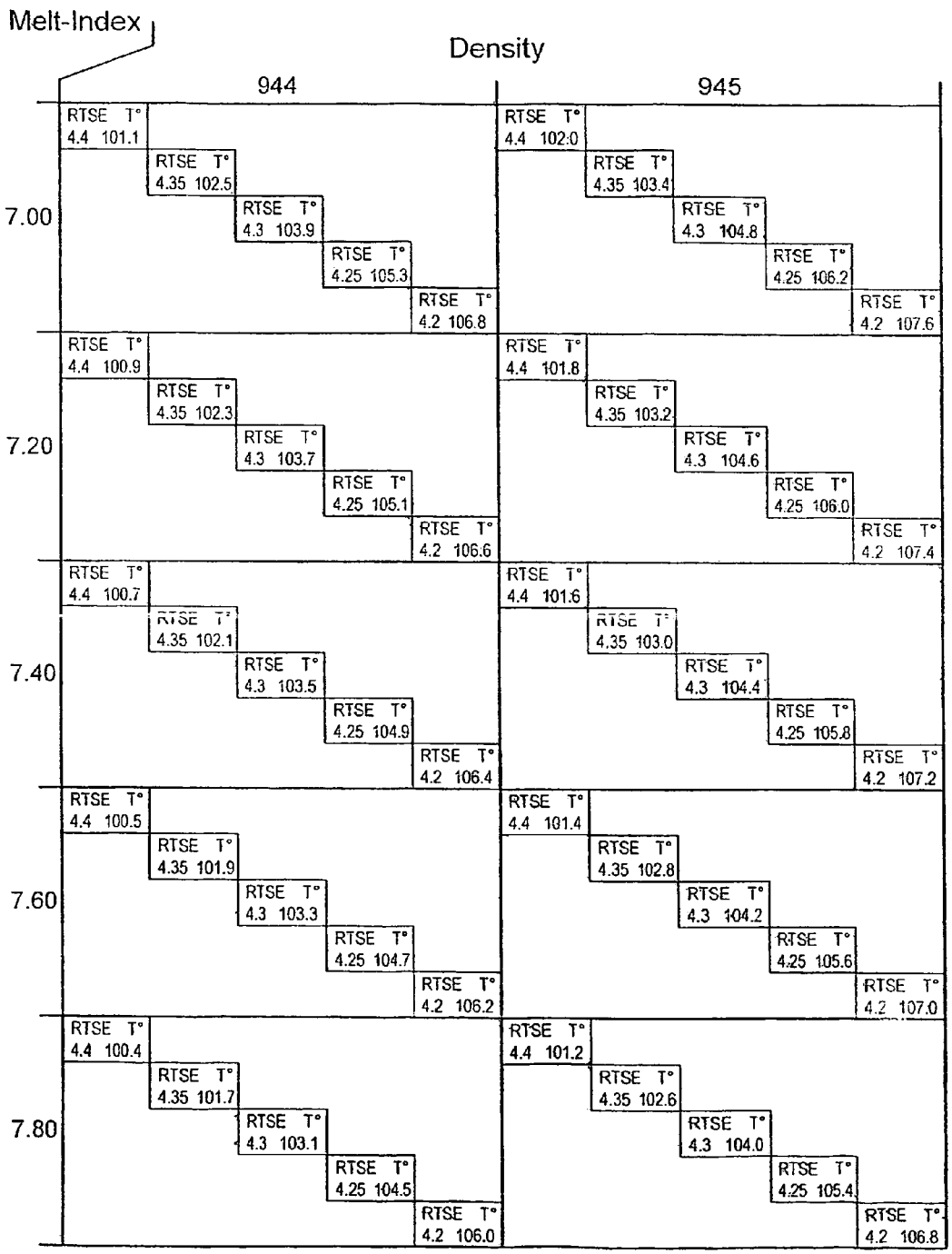

The RTSE (Resistance a la Traction au Seuil d'Ecoutement or Tensile Strength at Yield) factor is indicated in the attached tables (FIGS. 1 to 20B). A RTSE value comprised between 4.2 and 4.4 corresponds to each density/melt index couple. To every RTSE corresponds an operating temperature. For density or melt index values that are falling at the border of operating envelopes (window), the corresponding operating temperature envelope can easily be calculated by making linear interpolations. For example, in FIG. 1, for a 932/3.7 density/melt index couple, the operating temperature at an RTSE of 4.3 is the average between 96.2° C. (i.e. operating temperature for a 932/3.8 density/melt index couple at RTSE of 4.3) and 96.6° C. (i.e. operating temperature for a 932/3.6 density/melt index couple at RTSE of 4.3), i.e. 96.4° C. As already indicated, the invention is characterised in that the operating temperature is controlled such that the RTSE factor is first maintained in the operating-envelope corresponding to the D and MI values of the polyethylene produced, and the RTSE factor is maintained between 4.2 and 4.4.

According to a preferred embodiment of the present invention, during the production of a specific rotomoulding polyethylene grade, the RTSE factor is allowed to vary only by plus or minus 0.07, preferably 0.05 across the operating enveloppes, said variation occurring within a minimum of 4 hours of operation, preferably within a minimum of 8 hours of operation.

This process is preferably applied during the fluidised bed gas phase polymerisation of olefins, and may also advantageously be used during start-up and especially during product grade transition between two rotomoulding polyethyene.

The instantaneous density and melt index properties correspond to the properties of the resin formed instantaneously in the reacting conditions at a given time. The "instantaneous properties" are different from the pellet properties which correspond to a mixture of different resins formed continuously in the fluidised bed (averaging effect).

The process according to the present invention is particularly suitable for the manufacture of copolymers of ethylene. Preferred alpha-olefins used in combination with ethylene in the process of the present invention are those having from 4 to 8 carbon atoms. The preferred alpha-olefins are but-1-ene, pent-1-ene, hex-1-ene, 4-methylpent-1-ene, oct-1-ene and butadiene, the most preferred comonomer being the hex-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as $C_4$-$C_8$ alkane(s) or cycloalkane(s), particularly butane, pentane or hexane.

The process is particularly suitable for polymerising olefins at an absolute pressure of between 0.5 and 6 MPa and at a temperature of between 85 and 115° C., preferably between 90° C. and 110° C.

The polymerisation is preferably carried out continuously in a vertical fluidised bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. The process is also suitable for use with Ziegler catalysts supported on silica. The process is also especially suitable for use with metallocene catalysts in view of the particular affinity and reactivity experienced with comonomers and hydrogen. The process can also be advantageously applied with a late transition metal catalyst, i.e. a metal from Groups VIIIb or Ib (Groups 8-11) of the Periodic Table. In particular the metals Fe, Co, Ni, Ru, Rh, Pd, Os, Ir, and Pt are preferred, especially Fe, Co and Ni. The late transition metal complex may comprise bidentate or tridentate ligands, preferably coordinated to the metal through nitrogen atoms. As examples are those complexes disclosed in WO96/23010. Suitable iron and/or cobalt complexes catalysts can also be found in WO98/27124 or in WO99/12981.

It is also possible to use a high-activity catalyst consisting essentially of a chromium oxide activated by a heat treatment and associated with a granular support based on a refractory oxide.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

According to a preferred embodiment of the present invention, the catalyst is a Ziegler-Natta catalyst (i.e., non-metallocene) containing magnesium and titanium; the magnesium is preferably acting as the support; the catalyst is thus preferably non supported on silica. Preferably, the catalyst is subjected to a prepolymerisation stage. A most preferred catalyst corresponds to the catalysts disclosed in WO9324542.

According to a preferred embodiment of the present invention, the polyethylene has a density comprised between 930 and 944 kg/m3 and a melt index comprised between 3 and 7.8. The polyethylene is preferably an hex-1-ene copolymer of ethylene. It has preferably an ESCR property equal or higher than 400 h, more preferably higher than 500 h. It has preferably a Charpy property equal or higher than 10 kJ/m2, more preferably equal or higher than 15 kJ/m2. The molecular weight distribution is preferably comprised between 3 and 8, more preferably 3.5 and 5.

According to a more preferred embodiment of the present invention, the polyethylene has a density comprised between 930 and 944 kg/m3 and a melt index comprised between 5 and 7.8. The polyethylene is preferably an hex-1-ene copolymer of ethylene. It has preferably an ESCR property equal or higher than 750 h. It has preferably a Charpy property equal or higher than 15 kJ/m2. The molecular weight distribution is preferably comprised between 3 and 8, more preferably 3.5 and 5.

The said polyethylene is preferably a non-metallocene containing polymer.

EXAMPLES

The polymerisations are carried out continuously in a vertical fluidised bed reactor as described in the example of European patent application EP-0 855 411.

The catalyst (prepolymerised Ziegler-Natta catalyst) used in all the following examples is prepared according to the procedure disclosed in example 1 of WO9324542.

Comparative examples 1 to 3 correspond to non RTSE polymerisation conditions.

Examples 4 to 9 correspond to RTSE polymerisations conditions.

The data are given in the below table.

| Ex. | Comonomer | Polymerisation Temperature (° C.) | MI (2.16 kg) ASTM D1238 | Density (kg/m3) ASTM D792 & ASTM D1248-84 | Molecular Weight Distribution (MWD Mw/Mn) | ESCR (h) (B) ASTM D1693 | Notched Charpy Impact Resistance (kJ/m2) ISO 179-2 |
|---|---|---|---|---|---|---|---|
| C1 | Butene-1 | 83 | 3.1 | 943.2 | 4 | 185 | 9 |
| C2 | Butene-1 | 83 | 4.1 | 938.0 | 4 | 200 | 9 |
| C3 | Butene-1 | 83 | 6.0 | 935.2 | 4.5 | 900 | 13 |
| 4 | Butene-1 | 108 | 3.0 | 943.3 | 4 | 230 | 9 |
| 5 | Butene-1 | 101 | 3.9 | 938.1 | 4 | 290 | 10 |
| 6 | Butene-1 | 96 | 6.2 | 934.8 | 4.5 | 1150 | 15 |
| 7 | Hexene-1 | 108 | 3.3 | 942.9 | 4 | 400 | 14 |
| 8 | Hexene-1 | 101 | 4.2 | 937.8 | 4 | 550 | 15 |
| 9 | Hexene-1 | 96 | 6.3 | 935.1 | 4.5 | 1550 | 22 |

The invention claimed is:

1. A process for producing polyethylene for rotomoulding, having a density A of from 930 to 944 kg/m$^3$ and a melt index B of from 3 to 7.8 g/10 min, by (co-)polymerization of ethylene in a fluidised bed gas phase reactor, said process comprising determining the instantaneous density d and melt index MI of the polyethylene powder exiting a fluidized bed gas phase reactor, allowing the density and melt index to vary around their A and B values by a value of plus or minus 3 kg/m$^3$ for the density and plus or minus 30% for the melt index, wherein the operating temperature is controlled such that a.) an RTSE factor is first maintained in an operating envelope corresponding to the d and MI values of the polyethylene produced, and b.) then the RTSE factor is maintained between 4.2 and 4.4.

2. The process according to claim 1, wherein the density and melt index are respectively allowed to vary around their A and B values by a value of plus or minus 2 kg/m$^3$ for the density and plus or minus 15% for the melt index.

3. The process according to claim 1 or 2, wherein the RTSE factor is allowed to vary only by plus or minus 0.07 across the operating envelope(s), said variation occurring within a minimum of 4 hours of operation.

4. The process according to claim 3, wherein the RTSE variation is only allowed within a minimum of 8 hours of operation.

5. The process according to claims 3, wherein the RTSE factor is allowed to vary only by plus or minus 0.05 across the operating envelope(s).

6. The process according to claim 1, wherein the process is applied during product grade transition between two polyethyenes for rotomoulding.

7. The process according claim 1, wherein the polyethylene is a copolymer of ethylene and hex-1-ene.

8. The process according to claim 1, wherein the polyethylene for rotomoulding has a density of from 933 to 941 kg/m$^3$ and a melt index of from 3 to 7 g/10 min.

9. A polyethylene for rotomoulding produces by the process of claim 1, and having a density of from 930 to 944 kg/m$^3$, a melt index according to ASTM-D-1238, condition A (2.16 kg) of from 3 to 7.8 g/10 min, an ESCR property according to ASTM-D-1693 equal or higher than 400 h and a Charpy property equal or higher than 10 kJ/m$^2$.

10. A hex-1-ene copolymer of ethylene having a density of from 930 to 944 kg/m$^3$ and a melt index according to ASTM-D-1238, condition A (2.16 kg) of from 3 to 7.8 g/10 min, an ESCR property according to ASTM-D-1693 equal or higher than 400 h and a Charpy property equal or higher than 10 kJ/m$^2$.

* * * * *